United States Patent
Chan et al.

(10) Patent No.: US 12,258,495 B2
(45) Date of Patent: Mar. 25, 2025

(54) ADHESIVE COMPOSITION AND METHODS OF FORMING THE SAME

(71) Applicant: SAINT-GOBAIN PERFORMANCE PLASTICS CORPORATION, Solon, OH (US)

(72) Inventors: Nicky Chan, Hudson, MA (US); Olivia Gady, Saint Martin de Jussac (FR); Choung-Houng Lai, Acton, MA (US); Yubo Cui, Shrewsbury, MA (US); James N. Gordon, Waban, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 405 days.

(21) Appl. No.: 16/720,149

(22) Filed: Dec. 19, 2019

(65) Prior Publication Data

US 2020/0208027 A1    Jul. 2, 2020

Related U.S. Application Data

(60) Provisional application No. 62/786,016, filed on Dec. 28, 2018.

(51) Int. Cl.

| | | |
|---|---|---|
| *C09J 151/00* | (2006.01) | |
| *C08F 2/50* | (2006.01) | |
| *C08F 220/06* | (2006.01) | |
| *C08F 220/18* | (2006.01) | |
| *C08F 236/20* | (2006.01) | |
| *C08F 236/22* | (2006.01) | |
| *C08K 5/00* | (2006.01) | |
| *C08K 5/01* | (2006.01) | |

(Continued)

(52) U.S. Cl.
CPC .............. *C09J 151/003* (2013.01); *C08F 2/50* (2013.01); *C08F 220/06* (2013.01); *C08F 220/1808* (2020.02); *C08F 220/1811* (2020.02); *C08F 236/20* (2013.01); *C08F 236/22* (2013.01); *C08K 5/0025* (2013.01); *C08K 5/01* (2013.01); *C08K 5/132* (2013.01); *C08K 5/37* (2013.01); *C08K 7/28* (2013.01); *C09J 7/38* (2018.01); *C09J 133/08* (2013.01); *C09J 133/10* (2013.01); *G01R 23/005* (2013.01); *G01R 31/002* (2013.01); *G01R 31/30* (2013.01); *G01R 31/31709* (2013.01); *G01R 31/31719* (2013.01); *H04L 9/0866* (2013.01); *H04L 9/3278* (2013.01); *C09J 2203/00* (2013.01); *C09J 2400/14* (2013.01); *C09J 2400/22* (2013.01); *C09J 2423/106* (2013.01); *C09J 2423/166* (2013.01); *G01R 31/31703* (2013.01)

(58) Field of Classification Search
CPC ........ C09J 151/003; C09J 7/38; C09J 133/08; C09J 133/10; C09J 2203/00; C09J 2400/14; C09J 2400/22; C09J 2423/106; C09J 2423/166; C09J 2301/408; C09J 2301/412; C09J 2433/00; C09J 2451/00; C09J 7/10; C09J 2400/24; C09J 7/30; C09J 11/06; C09J 133/04; C08F 2/50; C08F 220/06; C08F 220/1808; C08F 220/1811; C08F 236/20; C08F 236/22; C08F 265/06; C08K 5/0025; C08K 5/01; C08K 5/132; C08K 5/37; C08K 7/28; G01R 23/005; G01R 31/002; G01R 31/30; G01R 31/31709; G01R 31/31719; G01R 31/31703; G01R 31/31932; H04L 9/0866; H04L 9/3278; H03K 5/24; C09D 151/003

See application file for complete search history.

(56) References Cited

U.S. PATENT DOCUMENTS

| | | |
|---|---|---|
| 3,492,276 A | 1/1970 | Smith |
| 3,806,484 A | 4/1974 | Dargan |

(Continued)

FOREIGN PATENT DOCUMENTS

| | | |
|---|---|---|
| AU | 472990 B2 | 9/1973 |
| AU | 2012322689 A1 | 5/2014 |

(Continued)

OTHER PUBLICATIONS

Heuts et al., Catalytic Chain Transfer Polymerization: an Overview, Australian Journal of Chemistry, 55, 6-7 Spec., 381-398, 2002. (Abstract only).

(Continued)

*Primary Examiner* — Jessica M Roswell
(74) *Attorney, Agent, or Firm* — Abel Schillinger, LLP; Chi Suk Kim

(57) ABSTRACT

An adhesive may include an adhesive structure and an adhesive composition. The adhesive structure may include a graft copolymer. The adhesive composition may include at least about 1 wt. % and not greater than 40 wt. % of a macromonomer component for a total weight of the adhesive composition, at least about 50 wt. % and not greater than about 98 wt. % of a (meth)acrylic based polymeric component A for a total weight of the adhesive composition, and at least about 0.1 wt. % and not greater than about 30 wt. % of a tackifier component for a total weight of the adhesive composition. The macromonomer component may have a weight-average molecular weight of at least 1000 g/mol and a glass transition temperature (Tg) of at least about 40° C. The (meth)acrylic based polymeric component A may have a glass transition temperature (Tg) of not greater than about 20° C.

14 Claims, 4 Drawing Sheets

(51) Int. Cl.

| | |
|---|---|
| *C08K 5/132* | (2006.01) |
| *C08K 5/37* | (2006.01) |
| *C08K 7/28* | (2006.01) |
| *C09J 7/38* | (2018.01) |
| *C09J 133/08* | (2006.01) |
| *C09J 133/10* | (2006.01) |
| *G01R 23/00* | (2006.01) |
| *G01R 31/00* | (2006.01) |
| *G01R 31/30* | (2006.01) |
| *G01R 31/317* | (2006.01) |
| *H04L 9/08* | (2006.01) |
| *H04L 9/32* | (2006.01) |

(56) References Cited

U.S. PATENT DOCUMENTS

| | | |
|---|---|---|
| 4,117,235 A | 9/1978 | Taylor |
| 4,414,370 A | 11/1983 | Hamielec et al. |
| 4,546,160 A | 10/1985 | Brand et al. |
| 4,726,982 A | 2/1988 | Traynor et al. |
| 5,006,582 A | 4/1991 | Mancinelli |
| 5,225,470 A | 7/1993 | Mancinelli |
| 5,410,004 A | 4/1995 | Williams |
| 5,434,213 A | 7/1995 | Chen et al. |
| 5,578,683 A | 11/1996 | Koch et al. |
| 5,602,220 A | 2/1997 | Haddleston et al. |
| 5,625,005 A | 4/1997 | Mallya et al. |
| 5,644,007 A | 7/1997 | Davidson et al. |
| 5,648,425 A | 7/1997 | Everaerts et al. |
| 5,679,457 A | 10/1997 | Bergerson |
| 5,686,504 A | 11/1997 | Ang |
| 5,691,432 A | 11/1997 | Williams |
| 5,703,169 A | 12/1997 | Zajaczkowski et al. |
| 5,710,227 A | 1/1998 | Freeman et al. |
| 5,731,387 A | 3/1998 | Zajaczkowski |
| 5,756,605 A | 5/1998 | Moad et al. |
| 5,804,610 A | 9/1998 | Hamer et al. |
| 5,804,632 A | 9/1998 | Haddleton et al. |
| 5,840,783 A | 11/1998 | Momchilovich et al. |
| 5,936,026 A | 8/1999 | Huybrechts et al. |
| 5,981,666 A | 11/1999 | Zajaczkowski et al. |
| 6,096,420 A | 8/2000 | Wilhoit et al. |
| 6,111,027 A | 8/2000 | Wright et al. |
| 6,172,149 B1 | 1/2001 | Shah et al. |
| 6,294,591 B1 | 9/2001 | Blum et al. |
| 6,329,068 B1 | 12/2001 | Shah et al. |
| 6,348,249 B2 | 2/2002 | Meyer |
| 6,376,626 B1 | 4/2002 | Chiefari et al. |
| 6,379,791 B1 | 4/2002 | Cernohous et al. |
| 6,388,006 B1 | 5/2002 | Fujita et al. |
| 6,388,026 B1 | 5/2002 | Campbell et al. |
| 6,407,146 B1 | 6/2002 | Fujita et al. |
| 6,417,267 B1 | 7/2002 | Stockl et al. |
| 6,437,033 B1 | 7/2002 | Shah et al. |
| 6,455,634 B1 | 9/2002 | Khandpur et al. |
| 6,489,400 B2 | 12/2002 | Khandpur et al. |
| 6,503,621 B1 | 1/2003 | Ma et al. |
| 6,552,118 B2 | 4/2003 | Fujita et al. |
| 6,552,144 B1 | 4/2003 | Campbell et al. |
| 6,589,651 B2 | 7/2003 | Carlson et al. |
| 6,605,681 B1 | 8/2003 | Villalobos et al. |
| 6,608,143 B1 | 8/2003 | Fukuoka et al. |
| 6,630,239 B2 | 10/2003 | Cernohous et al. |
| 6,652,963 B2 | 11/2003 | Husemann et al. |
| 6,657,011 B2 | 12/2003 | Lau et al. |
| 6,663,958 B2 | 12/2003 | Husemann et al. |
| 6,670,417 B2 | 12/2003 | Foreman et al. |
| 6,723,786 B2 | 4/2004 | Husemann et al. |
| 6,753,079 B2 | 6/2004 | Husemann et al. |
| 6,783,850 B2 | 8/2004 | Takizawa et al. |
| 6,784,240 B2 | 8/2004 | Hasegawa et al. |
| 6,828,019 B2 | 12/2004 | Kong et al. |
| 6,887,917 B2 | 5/2005 | Yang et al. |
| 6,939,911 B2 | 9/2005 | Tosaki et al. |
| 6,964,999 B1 | 11/2005 | Nakagawa et al. |
| 6,994,904 B2 | 2/2006 | Joseph et al. |
| 7,012,114 B2 | 3/2006 | Bett et al. |
| 7,129,294 B2 | 10/2006 | Nakagawa et al. |
| 7,262,242 B2 | 8/2007 | Gielens et al. |
| 7,348,376 B2 | 3/2008 | Gelles |
| 7,462,663 B2 | 12/2008 | Kim et al. |
| 7,465,767 B2 | 12/2008 | Simal et al. |
| 7,491,758 B2 | 2/2009 | Amano et al. |
| 7,649,066 B2 | 1/2010 | Magnet et al. |
| 7,655,285 B2 | 2/2010 | Cho et al. |
| 7,671,134 B2 | 3/2010 | Casper |
| 7,691,925 B2 | 4/2010 | Amano et al. |
| 7,696,278 B2 | 4/2010 | Kim et al. |
| 7,799,853 B2 | 9/2010 | Ukei et al. |
| 7,834,104 B2 | 11/2010 | Nakamura et al. |
| 7,927,703 B2 | 4/2011 | Xia et al. |
| 7,989,525 B2 | 8/2011 | Amano et al. |
| 8,013,085 B2 | 9/2011 | Schmid et al. |
| 8,034,879 B2 | 10/2011 | Balk et al. |
| 8,101,276 B2 | 1/2012 | Paul et al. |
| 8,163,833 B2 | 4/2012 | Moeller et al. |
| 8,318,852 B2 | 11/2012 | Kim et al. |
| 8,318,859 B2 | 11/2012 | Amano et al. |
| 8,333,865 B2 | 12/2012 | Husemann et al. |
| 8,404,344 B2 | 3/2013 | Ukei et al. |
| 8,410,218 B2 | 4/2013 | Abe et al. |
| 8,440,304 B2 | 5/2013 | Paul et al. |
| 8,557,378 B2 | 10/2013 | Yamanaka et al. |
| 8,710,139 B2 * | 4/2014 | Shigetomi .............. C09J 133/10 428/354 |
| 8,791,207 B2 | 7/2014 | Steelman et al. |
| 8,802,785 B2 | 8/2014 | Kautz et al. |
| 8,816,011 B2 | 8/2014 | Kautz et al. |
| 8,829,117 B2 | 9/2014 | Balk et al. |
| 8,846,833 B2 | 9/2014 | Prenzel |
| 8,895,669 B2 | 11/2014 | Balk et al. |
| 8,969,495 B2 | 3/2015 | Hustad et al. |
| 9,006,362 B2 | 4/2015 | Zhu et al. |
| 9,011,995 B2 | 4/2015 | Park et al. |
| 9,238,762 B2 | 1/2016 | Schaffer et al. |
| 9,290,682 B2 | 3/2016 | Chen et al. |
| 9,359,531 B2 | 6/2016 | Sherman et al. |
| 9,410,028 B2 | 8/2016 | Prenzel et al. |
| 9,540,458 B2 | 1/2017 | Prenzel |
| 9,605,189 B2 | 3/2017 | Hirose et al. |
| 9,701,875 B1 | 7/2017 | Yarusso et al. |
| 9,938,433 B2 | 4/2018 | Kim et al. |
| 10,144,854 B2 | 12/2018 | Yoon et al. |
| 10,544,295 B2 | 1/2020 | Heemann et al. |
| 2001/0025083 A1 | 9/2001 | Stark et al. |
| 2002/0026020 A1 | 2/2002 | Campbell et al. |
| 2003/0114580 A1 | 6/2003 | Kim et al. |
| 2004/0010091 A1 | 1/2004 | Paquet, Jr. et al. |
| 2004/0022693 A1 | 2/2004 | Grady |
| 2004/0071919 A1 | 4/2004 | Sakurai et al. |
| 2004/0127638 A1 | 7/2004 | Mathew et al. |
| 2004/0210019 A1 | 10/2004 | Hasegawa et al. |
| 2005/0003094 A1 | 1/2005 | Grady et al. |
| 2005/0158475 A1 | 7/2005 | Bell et al. |
| 2005/0192394 A1 | 9/2005 | Jung et al. |
| 2005/0217789 A1 | 10/2005 | Eckstein et al. |
| 2005/0250887 A1 | 11/2005 | Yang et al. |
| 2006/0052563 A1 | 3/2006 | Nakagawa et al. |
| 2006/0057366 A1 | 3/2006 | Husemann et al. |
| 2006/0154097 A1 | 7/2006 | Amano et al. |
| 2007/0092733 A1 | 4/2007 | Yang et al. |
| 2007/0106011 A1 | 5/2007 | Husemann et al. |
| 2007/0128260 A1 | 6/2007 | Lau et al. |
| 2008/0176086 A1 | 7/2008 | Irifune |
| 2009/0082488 A1 | 3/2009 | Takeda et al. |
| 2009/0198016 A1 | 8/2009 | Sormani et al. |
| 2009/0234072 A1 | 9/2009 | Nakagawa et al. |
| 2010/0075129 A1 | 3/2010 | Nagasaki et al. |
| 2010/0101723 A1 | 4/2010 | Okamoto et al. |
| 2010/0120931 A1 | 5/2010 | Zajaczkowski et al. |
| 2010/0266837 A1 | 10/2010 | Srivatsan et al. |
| 2010/0285244 A1 | 11/2010 | Kho |
| 2011/0118372 A1 | 5/2011 | Lester et al. |

(56) References Cited

U.S. PATENT DOCUMENTS

| | | |
|---|---|---|
| 2011/0177329 A1 | 7/2011 | Xia et al. |
| 2011/0213091 A1 | 9/2011 | Balk et al. |
| 2011/0269913 A1 | 11/2011 | Balk et al. |
| 2013/0004768 A1 | 1/2013 | Yamagata et al. |
| 2013/0011672 A1 | 1/2013 | Okamoto et al. |
| 2013/0172511 A1 | 7/2013 | Moeller et al. |
| 2013/0177758 A1 | 7/2013 | Shigetomi et al. |
| 2013/0184383 A1 | 7/2013 | Cochran et al. |
| 2013/0197156 A1 | 8/2013 | Palasz et al. |
| 2014/0044959 A1 | 2/2014 | Joo et al. |
| 2014/0057091 A1 | 2/2014 | Krawinkel et al. |
| 2014/0323604 A1 | 10/2014 | Burmeister et al. |
| 2014/0329960 A1 | 11/2014 | Klots et al. |
| 2014/0329971 A1 | 11/2014 | Prenzel |
| 2015/0044457 A1 | 2/2015 | Chen et al. |
| 2015/0322296 A1 | 11/2015 | Keite-Telgenbuscher et al. |
| 2016/0083629 A1 | 3/2016 | Wang et al. |
| 2016/0319169 A1 | 11/2016 | Gower et al. |
| 2017/0002236 A1 | 1/2017 | Papenbroock et al. |
| 2017/0029548 A1 | 2/2017 | Kawai et al. |
| 2017/0198169 A1 | 7/2017 | Dimmer |
| 2017/0283670 A1 | 10/2017 | Yarusso et al. |
| 2019/0352544 A1 | 11/2019 | Lin et al. |
| 2020/0208024 A1 | 7/2020 | Chan et al. |
| 2020/0208025 A1 | 7/2020 | Cui et al. |

FOREIGN PATENT DOCUMENTS

| | | |
|---|---|---|
| CA | 1185399 A | 4/1985 |
| CA | 2321784 A1 | 9/1999 |
| CN | 1434844 A | 8/2003 |
| CN | 1141326 C | 3/2004 |
| CN | 1572852 A | 2/2005 |
| CN | 1260316 C | 6/2006 |
| CN | 101535436 A | 9/2009 |
| CN | 103097483 A | 5/2013 |
| CN | 103396741 A | 11/2013 |
| CN | 103524966 B | 1/2014 |
| CN | 104262948 A | 1/2015 |
| CN | 105229103 A | 1/2016 |
| DE | 102012208597.00 A1 | 11/2013 |
| EP | 1433799 A3 | 6/2004 |
| EP | 1491604 B1 | 2/2006 |
| EP | 1686143 A3 | 8/2006 |
| EP | 1319053 B1 | 12/2007 |
| EP | 2268758 B1 | 12/2013 |
| EP | 02676975 A2 | 12/2013 |
| JP | S63072532 A | 4/1988 |
| JP | H02202571 A | 8/1990 |
| JP | H05017726 A | 1/1993 |
| JP | 2510627 B2 | 6/1996 |
| JP | H09505103 A | 5/1997 |
| JP | 3045673 A | 5/2000 |
| JP | 2000198853 A | 7/2000 |
| JP | 2002194175 A | 7/2002 |
| JP | 2002226590 A | 8/2002 |
| JP | 2002256045 A | 9/2002 |
| JP | 2002256226 A | 9/2002 |
| JP | 2008013770 A | 1/2008 |
| JP | 2008291071 A | 12/2008 |
| JP | 4215898 B2 | 1/2009 |
| JP | 2009249538 A | 10/2009 |
| JP | 2009249539 A | 10/2009 |
| JP | 2010150400 A | 7/2010 |
| JP | 2010254956 A | 11/2010 |
| JP | 2011026551 A | 2/2011 |
| JP | 2011052117 A | 3/2011 |
| JP | 2011184678 A | 9/2011 |
| JP | 201267280 A | 4/2012 |
| JP | 2012067279 A | 4/2012 |
| JP | 5021471 B2 | 9/2012 |
| JP | 2013018227 A | 1/2013 |
| JP | 2013018871 A | 1/2013 |
| JP | 2014162852 A | 9/2014 |
| JP | 2014214311 A | 11/2014 |
| JP | 2014533757 A | 12/2014 |
| JP | 2016041817 A | 3/2016 |
| JP | 2016523999 A | 8/2016 |
| JP | 2017014461 A | 1/2017 |
| JP | 2017025192 A | 2/2017 |
| JP | 2017095654 A | 6/2017 |
| JP | 2018123224 A | 8/2018 |
| JP | 2018159017 A | 10/2018 |
| JP | 2018193563 A | 12/2018 |
| KR | 20040030282 A | 4/2004 |
| KR | 100477938 B1 | 3/2005 |
| KR | 101148762 B1 | 5/2012 |
| KR | 101337122 B1 | 12/2013 |
| KR | 101348516 B1 | 1/2014 |
| KR | 10-20170062369 A | 6/2017 |
| WO | 9513331 A1 | 5/1995 |
| WO | 9607522 A1 | 3/1996 |
| WO | 1999003905 A1 | 1/1999 |
| WO | 9964528 A1 | 12/1999 |
| WO | 2006033148 A1 | 3/2006 |
| WO | 2009117654 A1 | 9/2009 |
| WO | 2012128294 A1 | 9/2012 |
| WO | 2013059549 A1 | 4/2013 |
| WO | 2014163300 A1 | 10/2014 |
| WO | 2015041266 A1 | 3/2015 |
| WO | 2015175963 A1 | 11/2015 |
| WO | 2016000938 A1 | 1/2016 |
| WO | 2016109173 A1 | 7/2016 |
| WO | 2016109174 A1 | 7/2016 |
| WO | 2016109176 A1 | 7/2016 |
| WO | 2016109245 A1 | 7/2016 |
| WO | 2016130504 A1 | 8/2016 |
| WO | 2016142422 A1 | 9/2016 |
| WO | 2017123488 A1 | 7/2017 |
| WO | 2018101252 A1 | 6/2018 |
| WO | 2020139672 A1 | 7/2020 |
| WO | 2020139674 A1 | 7/2020 |

OTHER PUBLICATIONS

Gibson et al., Polymerization of Methyl Methacrylate Using Four-Coordinate (α-Diimine)Iron Catalysts: Atom Transfer Radical Polymerization vs Catalytic Chain Transfer, Macromolecules, 36, 8, 2591-2593, 2003. (1st page).

Allan et al., Organometallic Mediated Radical Polymerization, Progress in Polymer Science (Oxford), 37, 1, 127-156, 2012. (Abstract only).

Debuigne et al., Cobalt-Mediated Radical Polymerization of Acrylonitrile: Kinetics Investigations and DFT Calculations, Chemistry—A European Journal, 14, 25, 7623-7637, 2008. (Abstract only).

Heuts et al., Reversible Cobalt-Carbon Bond Formation in Catalytic Chain Transfer Polymerization, Macromolecules, 32, 8, 2511-2519, 1999. (Abstract only).

Suddaby et al., Catalytic Chain Transfer for Molecular Weight Control in the Emulsion Polymerization of Methyl Methacrylate and Methyl Methacrylate-Styrene, Macromolecules, 29, 25, 8083-8091, 1996. (Abstract only).

Sanayei et al., Catalytic Chain-Transfer in Polymerization of Methyl Methacrylate. I. Chain-Length Dependence of Chain-Transfer Coefficient, Journal of Macromolecular Science: Part A—Chemistry, 26, 8, 1137-1149, 1989. (Abstract only).

Haddleton et al., Radical-Addition-Fragmentation and Co-Polymerization of Methyl Methacrylate Macromonomers From Catalytic Chain Transfer Polymerization (CCTP), Polymer, 38, 25, 6207-6217, 1997. (Abstract only).

Sherwood et al., Controlled Radical Polymerisation of Methyl Acrylate Initiated by a Well- Defined Cobalt Alkyl Complex, Chemical Communications, 46, 14, 2456-2458, 2010. (Abstract only).

Neugebauer et al., Atom Transfer Radical Copolymerization of Glycidyl Methacrylate and Methyl Methacrylate, Journal of Applied Polymer Science, 124, 3, 2209-2215, 2012. (Abstract only).

Pierik, Catalytic Chain Transfer Copolymerization of Methyl Methacrylate and Butyl Acrylate, Macromolecular Chemistry and Physics, 204, 11, 1406-1418, 2003. (Abstract only).

(56) References Cited

OTHER PUBLICATIONS

Pierik, Catalytic Chain Transfer Copolymerization of Methyl, Methacrylate and Methyl Acrylate, Macromolecular Symposia, 165, 19-27, 2001. (Abstract only).
Datta et al., Atom Transfer Radical Polymerization of Hexyl Aerylate and Preparation of Its "All-Acrylate" Block Copolymers, Journal of Polymer Science, Part A: Polymer Chemistry, 46, 11, 3499-3511, 2008. (Abstract only).
Martchenko et al., Catalytic Chain Transfer in Polymerization of Acrylamide, European Polymer Journal, 33, 5, 713-718, 1997. (Abstract only).
Suddaby et al., Catalytic Chain Transfer in Polymerization of Methyl Methacrylate. II. Continuous Synthesis and Purification of Macromer, Journal of Applied Polymer Science, 43, 8, 1565-1575, 1991. (Abstract only).
Buchmeiser et al., Co(ACAC) 2-Mediated Radical Polymerization of Acrylonitrile: Control Over Molecular Weights and Copolymerization With Methyl Methacrylate, Macromolecular Materials and Engineering, 297, 9, 894-901, 2012. (Abstract only).
Pierik et al., High-Conversion Catalytic Chain Transfer Polymerization of Methyl Methacrylate, Journal of Applied Polymer Science, 91, 3, 1375-1388, 2004. (Abstract only).
Slavin et al., Cobalt-Catalyzed Chain Transfer Polymerization: a Review, Polymer Science: A Comprehensive Reference, 10 Volume Set, 3, 249-275, 2012. (Abstract only).
Bao et al., New Cobalt-Mediated Radical Polymerization (CMRP) of Methyl Methacrylate Initiated by Two Single-Component Dinuclear $\hat{I}^2$-Diketone Cobalt (II) Catalysts, PLoS ONE, 5, 10, e13629, 2010. (Abstract only).
Nurumbetov et al., Methacrylic Block Copolymers by Sulfur Free Raft (SF Raft) Free Radical Emulsion Polymerisation, Polymer Chemistry, 8, 6, 1084-1094, 2017. (Abstract only).
Bakac et al., Characterization of the structure, properties, and reactivity of a cobalt(II) macrocyclic complex, Inorganic Chemistry, 1986, 25, 23, 4108-4114. (1st page).
Grady et al., Studies of Higher Temperature Polymerization of N-Butyl Methacrylate and N-Butyl Acrylate, Macromolecular Symposia, 182, 149-168, 2002. (Abstract only).
Zhang et al., Preparation of PMMA-Co-PMPS Copolymers via Catalytic Chain Transfer Polymerization Techniqueand Evaluation of Their Apparent Chain Transfer Constants, Acta Polymerica Sinica, 7, 651-659, 2009. (Abstract only).
Xu et al., Progress in Pressure Sensitive Adhesives, Huaxue Fanying Gongcheng Yu Gongyi/Chemical Reaction Engineering and Technology, 31, 6, 556-565, 2015. (Abstract only).
Dong et al., Effect of Segment Structure on Mechanical Properties and Drug Release Behavior of Copolymer Pressure Sensitive Adhesives, Tianjin Daxue Xuebao (Ziran Kexue yu Gongcheng Jishu Ban)/Journal of Tianjin University Science and Technology, 45, 11, 1013-1019, 2012. (Abstract only).
Czech et al., Photoreactive UV-Crosslinkable Hotmelts Acrylic Pressure-Sensitive Adhesives Coated At Temperatures Between 80 and 120Â° C, Coating International, 43, 3, 26-28, 2010. (Abstract only).
Chen et al., Study on the Environmental Friendly Acrylate Pressure Sensitive Adhesive, Gaofenzi Cailiao Kexue Yu Gongcheng, 21, 6, 247-250, 2005. (Abstract only).
Ishitobi, Advanced Polymer Materials Synthesized by New Living Radical Polymerization Method (TERP), Annual Technical Conference—ANTEC, Conference Proceedings, 2458-2461, 2015.
Yoshida et al., Performance Improvement of Solvent-Type PSA, Fain Kemikaru, 43, 9, 47-52, 2014.
Ouzineb et al., Designed Nanoscale Heterogeneities for Controlling Water-Borne Pressure-Sensitive Adhesive Performance (NSHAPE), FATIPEC Congress, 29th, Recent Innovations and Future Challenges for the Coatings and Ink Industries, 382-400, 2008.
Glotfelter et al., UV Curable Monomers and Oligomers in PSA Applications, Adhesives Age, 40, 3, 50, 53-55, 1997.

Herze et al., Pressure Sensitive Adhesives Obtained by Irradiation, RADCURE '86 [Eighty Six], Conf. Proc., 10th, Dec. 29-Dec. 44, 1986.
Waterson et al., New Cobalt Catalysts for Use in Acrylic Polymerisations, American Chemical Society, Polymer Preprints, Division of Polymer Chemistry, 39, 2, 457-458, 1998.
Haddleton et al., Aqueous Solution Cobalt Mediated Catalytic Chain Transfer Polymerization, American Chemical Society, Polymer Preprints, Division of Polymer Chemistry, 40, 1, 381-382, 1999.
Steward et al., Catalytic Chain Transfer Polymerisation of Functional Methacrylates, American Chemical Society, Polymer Preprints, Division of Polymer Chemistry, 39, 2, 459-460, 1998.
Eason et al., Multifunctional Architecturally Controlled Polymeric Materials From Catalytic Chain Transfer Polymerization, American Chemical Society, Polymer Preprints, Division of Polymer Chemistry, 39, 2, 455-456, 1998.
Liu et al., Backbiting and $\hat{I}^2$-Scission Reactions in Free-Radical Polymerization of Methyl Acrylate, International Journal of Quantum Chemistry, 114, 5, 345-360, 2014.
Pierik et al., Shining a Light on Catalytic Chain Transfer, Macromolecular Symposia, Chapters 1-3, 182, 43-52, 2002.
Pierik et al., Shining a Light on Catalytic Chain Transfer, Macromolecular Symposia, Chapters 4-8, 182, 43-52, 2002.
International Search Report and Written Opinion for PCT/US2019/067335, mailed May 1, 2020, 12 pages.
International Search Report and Written Opinion for PCT/US2019/067333, mailed May 1, 2020, 10 pages.
International Search Report and Written Opinion for PCT/US2019/067329, mailed May 1, 2020, 12 pages.
Hamzehlou et al., Analyzing the Discrepancies in the Activation Energies of the Backbiting and $\hat{I}^2$-Scission Reactions in the Radical Polymerization of N-Butyl Acrylate, Polymer Chemistry, 7, 11, 2069-2077, 2016. (Abstract only).
Liu et al., Thermally Induced Aerobic Autopolymerization of Methyl Methacrylate in Amide-Type Solvents: Simultaneous Polymerization During Induction via Direct In Situ O2 Activation, Macromolecular Chemistry and Physics, 216, 11, 1201-1211, 2015. (Abstract only).
Liu et al., Modeling Spin-Forbidden Monomer Self-Initiation Reactions in Spontaneous Free-Radical Polymerization of Acrylates and Methacrylates, Journal of Physical Chemistry A, 118, 40, 9310-9318, 2014. (Abstract only).
Moghadam et al., Computational Study of Chain Transfer to Monomer Reactions in High-Temperature Polymerization of Alkyl Acrylates, Journal of Physical Chemistry A, 117, 12, 2605-2618, 2013.
Liu et al., Computational Study of Cyclohexanone-Monomer Co-Initiation Mechanism in Thermal Homo-Polymerization of Methyl Acrylate and Methyl Methacrylate, Journal of Physical Chemistry A, 116, 22, 5337-5348, 2012. (Abstract only).
Katzer et al., Thermal Polymerization of Styrene, Part 1—Bulk Polymerization, Macromolecular Reaction Engineering, 6, 5, 213-224, 2012. (Abstract only).
Rier et al., Macroscopic Mechanistic Modeling and Optimization of a Self-Initiated High-Temperature Polymerization Reactor, 5991445, 2011.
Srinivasan et al., Computational Evidence for Self-Initiation in Spontaneous High-Temperature Polymerization of Methyl Methacrylate, Journal of Physical Chemistry A, 115, 6, 1125-1132, 2011. (Abstract only).
Srinivasan et al., Self-Initiation Mechanism in Spontaneous Thermal Polymerization of Ethyl and N-Butyl Acrylate: A Theoretical Study, Journal of Physical Chemistry A, 114, 30, 7975-7983, 2010. (Abstract only).
Srinivasan et al., Understanding Kinetics of Spontaneous Thermal Polymerization of Alkyl Acrylates: an Experimental Study, 2008. (Abstract only).
Hart-Smith et al., Living Star Polymer Formation: Detailed Assessment of Poly(Acrylate) Radical Reaction Pathways via ESI-MS, Macromolecules, 41, 9, 3023-3041, 2008. (Abstract only).
Jachuck et al., Continuous Photopolymerization of N-Butyl Acrylate Using a Narrow Channel Reactor, Macromolecules, 41, 9, 3053-3062, 2008. (Abstract only).

(56) References Cited

OTHER PUBLICATIONS

Rantow et al., Global Parametric Identifiability of Mechanistic Models in Chain Polymerization, 2006, 1657188, 2006. (Abstract only).
Rantow et al., Spontaneous Polymerization and Chain Microstructure Evolution in High-Temperature Solution Polymerization of N-Butyl Acrylate, Polymer, 47, 4, 1423-1435, 2006. (Abstract only).
Quan et al., High-Temperature Homopolymerization of Ethyl Acrylate and N-Butyl Acrylate: Polymer Characterization, Macromolecules, 38, 18, 7619-7628, 2005. (Abstract only).
Rantow et al., Optimal Control of a High-Temperature Semi-Batch Solution Polymerization Reactor, 5, ThC08.2, 2005. (Abstract only).
Peck et al., Secondary Reactions in the High-Temperature Free Radical Polymerization of Butyl Acrylate, Macromolecules, 37, 16, 5944-5951, 2004. (Abstract only).
Barner-Kowollik et al., Probing Mechanistic Features of Conventional, Catalytic and Living Free Radical Polymerizations Using Soft Ionization Mass Spectrometric, Polymer, 45, 23, 7791-7805, 2004, Techniques. (Abstract only).
Gallagher et al., Acrylic Triblock Copolymers Incorporating Isosorbide for Pressure Sensitive Adhesives, ACS Sustainable Chemistry and Engineering, 4, 6, 3379-3387, 2016. (Abstract only).
Callies et al., Combined Effect of Chain Extension and Supramolecular Interactions on Rheological and Adhesive Properties of Acrylic Pressure-Sensitive Adhesives, ACS Applied Materials and Interfaces, 8, 48, 33307-33315, 2016.
Ingale et al., Effect of Molecular Weight on Performance Properties of Pressure-Sensitive Adhesive of Poly (2-Ethylhexyl Acrylate) Synthesized by Raft-Mediated Miniemulsion Polymerization, Journal of Adhesion, 92, 3, 236-256, 2016. (Abstract only).
Saindane et al., Influence of Dioctyl Maleate Concentration on Performance Behavior of Water Based Pressure-Sensitive Adhesives via Reversible Additionâ€ Fragmentation Chain Transfer Emulsion Polymerization, Journal of Adhesion, 92, 12, 950-981, 2016. (Abstract only).
Nasiri et al., Sustainable Glucose-Based Block Copolymers Exhibit Elastomeric and Adhesive Behavior, Polymer Chemistry, 7, 33, 5233-5240, 2016. (Abstract only).
Gridnev et al., Catalytic Chain Transfer in Free-Radical Polymerizations, Chemical Reviews, 101, 12, 3611-3659, 2001. (1st page).
Li et al., In Situ Synthesis and Properties of Hydrogenated Rosin/Polyacrylate Composite Miniemulsions-Based Pressure Sensitive Adhesives, Journal of Adhesion Science and Technology, 29, 20, 2220-2232, 2015. (Abstract only).
Gurney et al., Mechanical Properties of a Waterborne Pressure-Sensitive Adhesive With a Percolating Poly(Acrylic Acid)-Based Diblock Copolymer Network: Effect of pH, Journal of Colloid and Interface Science, 448, 8-16, 2015. (Abstract only).
Debuigne, Overview of Cobalt-Mediated Radical Polymerization: Roots, State of the Art and Future Prospects, Progress in Polymer Science (Oxford), 34, 3, 211-239, 2009. (Abstract only).
Kajtna et al., Synthesis and Dynamic Mechanical Analysis of Nanocomposite UV Crosslinkable 100% Solid Acrylic Pressure Sensitive Adhesives, International Journal of Adhesion and Adhesives, 49, 18-25, 2014. (Abstract only).
Khanjani et al., Emulsion Semi-Batch Terpolymerization Process Using Hybrid Emulsifiers for Synthesizing New Emulsion Pressure Sensitive Adhesives (EPSAS), Journal of Adhesion, 90, 2, 174-194, 2014. (Abstract only).
Davis et al., Cobalt-Mediated Free-Radical Polymerization of Acrylic Monomers, Trends in Polymer Science, 3, 11, 365-373, 1995. (Abstract only).
Bae et al., Adhesion Performance and Surface Characteristics of Low Surface Energy PSAS Fluorinated by UV Polymerization, Polymer Engineering and Science, 53, 9, 1968-1978, 2013. (Abstract only).
Kajtna et al., "Design of Experiments" Analysis in Study of Solventless UV Crosslinkable Acrylic Pressure Sensitive Adhesives, International Journal of Adhesion and Adhesives, 41, 152-159, 2013. (Abstract only).
Bae et al., Adhesion Performance and Thermal Stability of Fluorinated PSAS as a Crosslinking System, Journal of Adhesion Science and Technology, 26, 1-3, 361-379, 2012. (Abstract only).
Haddleton et al., "Identifying the Nature of the Active Species in the Polymerization of Methacrylates: Inhibition of Methyl Methacrylate Homopolymerizations and Reactivity Ratios for Copolymerization of Methyl Methacrylate/N-Butyl Methacrylate in Classical Anionic, Alkyllithium/Trialkylaluminum-Initiated, Group Transfer Polymerization, Atom Transfer Radical Polymerization, Catalytic Chain Transfer, and Classical Free Radical Polymerization," Macromolecules 1997, 30, 14, 3992-3998. (Abstract only).
Sato et al., Facile Synthesis of Main-Chain Degradable Block Copolymers for Performance Enhanced Dismantlable Adhesion, ACS Applied Materials and Interfaces, 4, 4, 2057-2064, 2012. (Abstract only).
Inui et al., Pressure-Sensitive Adhesion System Using Acrylate Block Copolymers in Response to Photoirradiation and Postbaking as the Dual External Stimuli for On-Demand Dismantling, ACS Applied Materials and Interfaces, 4, 4, 2124-2132, 2012. (Abstract only).
Kajtna et al., Solventless UV Crosslinkable Acrylic Pressure Sensitive Adhesives, International Journal of Adhesion and Adhesives, 31, 8, 822-831, 2011. (Abstract only).
Jullian et al., Structure and Rheology of Di- and Triblock Copolymers of Polystyrene and Poly(N-Butyl Acrylate), Journal of Rheology, 55, 2, 379-400, 2011. (Abstract only).
Kajtna et al., UV Crosslinkable Microsphere Pressure Sensitive Adhesives-Influence on Adhesive Properties, International Journal of Adhesion and Adhesives, 31, 1, 29-35, 2011. (Abstract only).
Jullian et al., Rheological Characterization and Molecular Modeling of Poly(N-Butyl Acrylate), Applied Rheology, 20, 3, 1-11, 2010. (Abstract only).
Czech et al., Getting on the Right Tack: How Photoinitiator Type, Amount and Curing Affect PSA Performance, European Coatings Journal, 11, 34, 36-38, 2010. (Abstract only).
Jeusette et al., Microscopic Morphology of Blends Between a New "All-Acrylate" Radial Block Copolymer and a Rosin Ester Resin for Pressure Sensitive Adhesives, European Polymer Journal, 44, 12, 3931-3940, 2008. (Abstract only).
Do et al., UV-Curing Behavior and Adhesion Performance of Polymeric Photoinitiators Blended With Hydrogenated Rosin Epoxy Methacrylate for UV-Crosslinkable Acrylic Pressure Sensitive Adhesives, European Polymer Journal, 44, 11, 3871-3882, 2008. (Abstract only).
Simal et al., Adhesive Properties of a Radial Acrylic Block Co-Polymer With a Rosin Ester Resin, Journal of Adhesion Science and Technology, 21, 7, 559-574, 2007. (Abstract only).
Eslami et al., Morphological and Physical Properties of Triblock Copolymers of Methyl Methacrylate and 2-Ethylhexyl Methacrylate, Macromolecular Materials and Engineering, 291, 9, 1104-1118, 2006. (Abstract only).
Yamamoto et al., Synthesis and PSA Performance Study for Novel Acrylic and Butyl Acrylate Block Copolymers, International Journal of Adhesion and Adhesives, 22, 1, 37-40, 2002. (Abstract only).
Class et al., The Viscoelastic Properties of Rubber-Resin Blends. II. The Effect of Resin Molecular Weight, Journal of Applied Polymer Science, 30, 2, 815-24, 1985. (Abstract only).

\* cited by examiner

ADHESIVE COMPOSITION AND METHODS OF FORMING THE SAME

CROSS-REFERENCE TO RELATED APPLICATION(S)

This application claims priority under 35 U.S.C. § 119(e) to U.S. Provisional Patent Application No. 62/786,016, entitled "ADHESIVE COMPOSITION AND METHODS OF FORMING THE SAME," by Nicky CHAN et al., filed Dec. 28, 2018, which is assigned to the current assignee hereof and is incorporated herein by reference in its entirety.

FIELD OF THE DISCLOSURE

The present disclosure relates to an adhesive composition and methods of forming the same. The present disclosure further relates to a foam tape that includes an adhesive composition and methods of forming the same.

BACKGROUND

Pressure sensitive adhesives are used to attach a variety of substrates in a number of industrial and consumer markets. Depending on specific applications, pressure sensitive adhesives may be designed either as one single layer or as multiple layers. The substrates can be of similar nature, or of very different nature. The substrates of very different nature tend to be more challenging to be attached, especially when the substrate on one side is made of thermoplastic olefins including polypropylene and polypropylene/ethylene propylene diene terpolymer. Typically, pressure sensitive adhesives designed for these thermoplastic materials tend to lack sufficient cohesive strength as well as long term stability. These issues become more critical in those applications where the pressure sensitive adhesives are required to possess both high adhesion and high cohesion, and are expected to be exposed to elements in nature for many years. Therefore, there is a strong need to develop pressure sensitive adhesive compositions that retain high overall performance on thermoplastic olefins even after years of exposure.

SUMMARY

According to a first aspect, an adhesive may include an adhesive structure and an adhesive composition. The adhesive structure may include a graft copolymer. The adhesive composition may include at least about 1 wt. % and not greater than 40 wt. % of a macromonomer component for a total weight of the adhesive composition, at least about 50 wt. % and not greater than about 98 wt. % of a (meth)acrylic based polymeric component A for a total weight of the adhesive composition, and at least about 0.1 wt. % and not greater than about 30 wt. % of a tackifier component for a total weight of the adhesive composition. The macromonomer component may have a weight-average molecular weight of at least 1000 g/mol and a glass transition temperature (Tg) of at least about 40° C. The (meth)acrylic based polymeric component A may have a glass transition temperature (Tg) of not greater than about 20° C.

According to still another aspect, a method of forming an adhesive may include providing a pre-adhesive mixture, mixing the pre-adhesive mixture, and polymerizing the pre-adhesive mixture to form the adhesive. The pre-adhesive mixture may include at least about 1 wt. % and not greater than 40 wt. % of a pre-adhesive macromonomer component for a total weight of the pre-adhesive mixture, at least about 50 wt. % and not greater than about 98 wt. % of a pre-adhesive (meth)acrylic based polymeric component A for a total weight of the pre-adhesive mixture, and at least about 0.1 wt. % and not greater than about 30 wt. % of a pre-adhesive tackifier component for a total weight of the pre-adhesive mixture. The pre-adhesive macromonomer component may have a weight-average molecular weight of at least 1000 g/mol and a glass transition temperature (Tg) of at least about 40° C. The pre-adhesive (meth)acrylic based polymeric component A may have a glass transition temperature (Tg) of not greater than about 20° C. The adhesive formed by polymerizing the pre-adhesive mixture may include an adhesive structure and an adhesive composition. The adhesive structure may include a graft copolymer.

According to still another aspect, a monolayer foam tape may include a foam core comprising hollow microspheres within an adhesive. The adhesive may include an adhesive structure and an adhesive composition. The adhesive structure may include a graft copolymer. The adhesive composition may include at least about 1 wt. % and not greater than 40 wt. % of a macromonomer component for a total weight of the adhesive composition, at least about 50 wt. % and not greater than about 98 wt. % of a (meth)acrylic based polymeric component A for a total weight of the adhesive composition, and at least about 0.1 wt. % and not greater than about 30 wt. % of a tackifier component for a total weight of the adhesive composition. The macromonomer component may have a weight-average molecular weight of at least 1000 g/mol and a glass transition temperature (Tg) of at least about 40° C. The (meth)acrylic based polymeric component A may have a glass transition temperature (Tg) of not greater than about 20° C.

According to still another aspect, a foam tape may include a foam core and a first adhesive layer of a first adhesive overlying a first surface of the foam core. The foam core may include hollow microspheres within a foam material. The first adhesive may include a first adhesive structure and a first adhesive composition. The first adhesive structure may include a graft copolymer. The first adhesive composition may include at least about 1 wt. % and not greater than 40 wt. % of a first macromonomer component for a total weight of the first adhesive composition, at least about 50 wt. % and not greater than about 98 wt. % of a first (meth)acrylic based polymeric component A for a total weight of the first adhesive composition, and at least about 0.1 wt. % and not greater than about 30 wt. % of a first tackifier component for a total weight of the first adhesive composition. The first macromonomer component may have a weight-average molecular weight of at least 1000 g/mol and a glass transition temperature (Tg) of at least about 40° C. The first (meth)acrylic based polymeric component A may have a glass transition temperature (Tg) of not greater than about 20° C.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to an adhesive composition and methods of forming an adhesive composition, and more particularly to an adhesive composition having superior adhesion properties and methods of forming the same.

Figure 1:
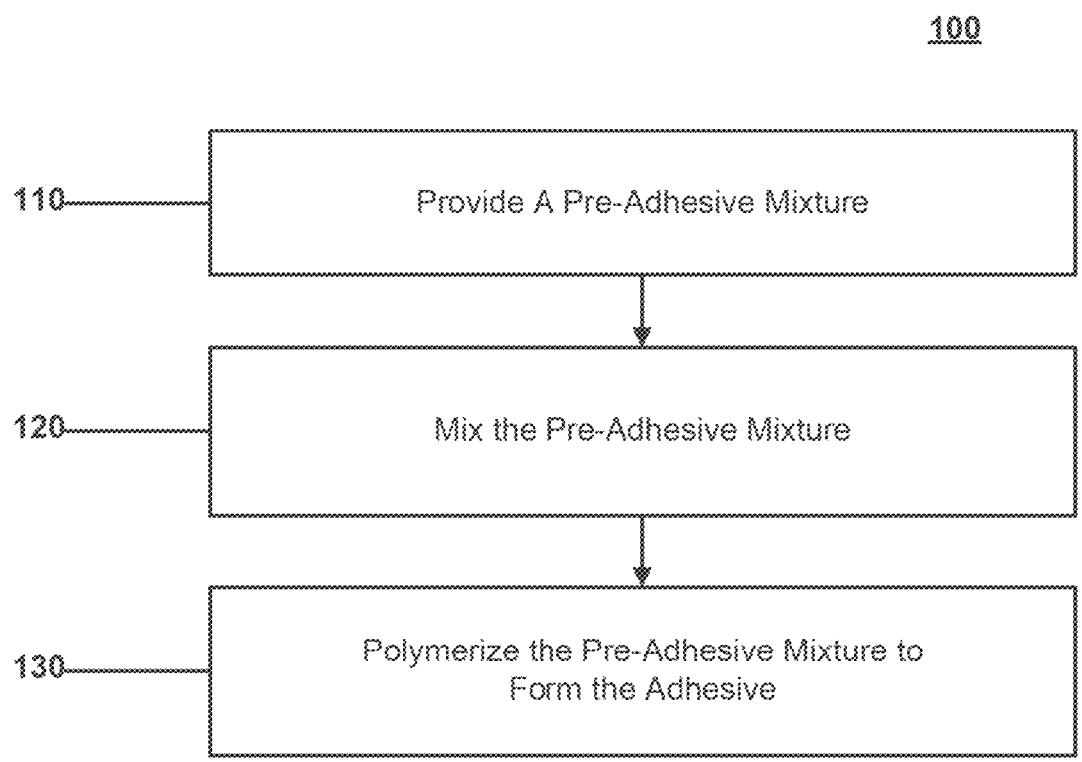
FIG. 1 includes a diagram showing an adhesive composition forming method according to embodiments described herein.

For purposes of illustration, FIG. 1 includes a diagram showing an adhesive composition forming method 100 according to particular embodiments described herein. The adhesive composition forming method 100 may include a first step 110 of providing a pre-adhesive mixture, a second step 120 of mixing the pre-adhesive mixture, and a third step 130 of polymerizing the pre-adhesive mixture to form the adhesive composition.

Referring to the first step 110, according to certain embodiments, the pre-adhesive mixture may include a pre-adhesive macromonomer component, a pre-adhesive (meth) acrylic based polymeric component A that is partially polymerized prior to being added to the mixture, and a pre-adhesive tackifier component.

According to particular embodiments, the pre-adhesive macromonomer component may be referred to as having high glass transition temperature (Tg). According to still other embodiments, the pre-adhesive macromonomer component may have a particular glass transition temperature (Tg) as estimated by the Fox Equation. For example, the pre-adhesive macromonomer component may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or at least about 80° C. or at least about 85° C. or at least about 95° C. or at least about 100° C. or at least about 105° C. or at least about 110° C. or at least about 115° C. or at least about 120° C. or at least about 125° C. or even at least about 130° C. It will be appreciated that the glass transition temperature of the pre-adhesive macromonomer component may be within a range between any of the values noted above. It will be further appreciated that the glass transition temperature of the pre-adhesive macromonomer component may be any value between any of the values noted above.

According to still other embodiments, the pre-adhesive macromonomer component may have a particular molecular weight. For example, the pre-adhesive macromonomer component may have a molecular weight of at least about 1,000 g/mol, such as, at least about 5,000 g/mol or at least about 10,000 g/mol or at least about 15,000 g/mol or at least about 20,000 g/mol or at least about 25,000 g/mol or at least about 30,000 g/mol. According to still other embodiments, the pre-adhesive macromonomer component may have a molecular weight of not greater than about 100,000 g/mol, such as, not greater than about 75,000 g/mol or not greater than about 50,000 g/mol. It will be appreciated that the molecular weight of the pre-adhesive macromonomer component may be within a range between any of the minimum and maximum values noted above. It will be further appreciated that the pre-adhesive macromonomer component may be any value between any of the minimum and maximum values noted above.

According to yet other embodiments, the pre-adhesive mixture may include a particular content of the pre-adhesive macromonomer component. For example, the content of the pre-adhesive macromonomer component in the pre-adhesive mixture may be at least about 2.0 wt. % for a total weight of the pre-adhesive mixture, such as, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or even at least about 20.0 wt. %. According to still other embodiments, the content of the pre-adhesive macromonomer component in the pre-adhesive mixture may be not greater than about 40.0 wt. % for a total weight of the pre-adhesive, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or even not greater than about 25 wt. %. It will be appreciated that the content of the pre-adhesive macromonomer component in the pre-adhesive mixture may be within a range between any of the minimum and maximum values noted above. It will be further appreciated that the content of the pre-adhesive macromonomer component in the pre-adhesive mixture may be any value between any of the minimum and maximum values noted above.

According to still other embodiments, the pre-adhesive macromonomer component may be advantageously synthesized through the use of reversible deactivation radical polymerization (RDRP) or controlled radical polymerization (CRP) techniques and contain a reactive functional group. Examples of these polymerization techniques include nitroxide mediated polymerization (NMP), reversible addition-fragmentation chain transfer polymerization (RAFT), atom transfer radical polymerization (ATRP), and cobalt mediated catalytic chain transfer polymerization (CCT). According to still other embodiments, the macromonomer component may be comprise a (meth)acrylic monomer having a pendant alicyclic functional group, such as cyclohexyl acrylate, cyclohexyl methacrylate, isobornyl acrylate, isobornyl methacrylate, dicyclopentanyl acrylate, dicyclopentanyl methacrylate, 1-Adamantyl acrylate, 1-Adamantyl methacrylate. According to still other embodiments, the pre-adhesive macromonomer component may contain a terminal vinyl double bond. According to yet other embodiments, the pre-adhesive macromonomer component may be capable of being polymerized in a free radical polymerization process According to particular embodiments, the pre-adhesive (meth)acrylic based polymeric component A may be referred to as having a low glass transition temperature (Tg). According to yet other embodiments, the pre-adhesive (meth) acrylic based polymeric component A may have a particular glass transition temperature (Tg) as estimated by the Fox Equation, based on the Tgs of the homopolymer of constituent monomers and the weight percent thereof. For example, the pre-adhesive (meth)acrylic based polymeric component A may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the pre-adhesive (meth)acrylic based polymeric component A may be within a range between any of the values noted above. It will be further appreciated that the glass transition temperature of the pre-adhesive (meth)acrylic based polymeric component A may be any value between any of the values noted above.

According to yet other embodiments, the pre-adhesive mixture may include a particular content of the pre-adhesive (meth)acrylic based polymeric component A. For example, the content of the pre-adhesive (meth)acrylic based polymeric component A in the pre-adhesive mixture may be at least about 50.0 wt. % for a total weight of the pre-adhesive mixture, such as, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or even at least about 77 wt. %. According to still other embodiments, the content of the pre-adhesive (meth)acrylic based polymeric component A in the pre-adhesive mixture may be not greater than about 90.0 wt. % for a total weight of the pre-adhesive mixture, such as, not greater than about 88 wt. % or not greater than about 85 wt. % or not greater than about 83 wt. % or not greater than about 80 wt. % or even not greater than about 78 wt. %. It will be appreciated that the content of the pre-adhesive (meth)acrylic based polymeric component A in the pre-adhesive mixture may be within a range between any of the minimum and maximum values noted above. It will be further appreciated that the content of the pre-adhesive (meth)acrylic based polymeric component A in the pre-adhesive mixture may be any value between any of the minimum and maximum values noted above.

According to still other embodiments, the pre-adhesive (meth)acrylic based polymeric component A may include a reaction product of a pre-adhesive monomer component a1 and a pre-adhesive monomer component a2.

According to certain embodiments, the pre-adhesive monomer component a1 may be an ethylenically unsaturated monomer. According to certain embodiments, the ethylenically unsaturated monomer may be selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

According to still other embodiments, the pre-adhesive monomer component a2 may be an acrylic ester. According to yet other embodiments, the pre-adhesive monomer component a2 may be an acrylic ester having a formula C=C($R^2$)($COOR^1$), where R1 is an alkyl group containing 1 to 24 carbons, and R2 is an H or methyl.

According to still other embodiments, the pre-adhesive (meth)acrylic based polymeric component A may include a particular content of the pre-adhesive monomer component a1. For example, the content of the pre-adhesive monomer component a1 in the pre-adhesive (meth)acrylic based polymeric component A may be at least about 0.1 wt. % for a total weight of the pre-adhesive (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to yet other embodiments, the content of the pre-adhesive monomer component a1 in the pre-adhesive (meth)acrylic based polymeric component A may be not greater than about 10 wt. % for a total weight of the pre-adhesive (meth)acrylic based polymeric component A, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the pre-adhesive monomer component a1 in the pre-adhesive (meth)acrylic based polymeric component A may be within a range between any of the minimum and maximum values noted above. It will be further appreciated that the content of the content of the pre-adhesive monomer component a1 in the pre-adhesive (meth)acrylic based polymeric component A may be any value between any of the minimum and maximum values noted above.

According to still other embodiments, the pre-adhesive (meth)acrylic based polymeric component A may include a particular content of the pre-adhesive monomer component a2. For example, the content of the pre-adhesive monomer component a2 in the pre-adhesive (meth)acrylic based polymeric component A may be at least about 80 wt. % for a total weight of the pre-adhesive (meth)acrylic based polymeric component A, such as, at least about 82 wt. % or at least about 85 wt. % or at least about 87 wt. % or at least about 90 wt. % or at least about 92 wt. % or at least about 95 wt. % or at least about 97 wt. %. According to yet other embodiments, the content of the pre-adhesive monomer component a2 in the pre-adhesive (meth)acrylic based polymeric component A may be not greater than about 99.0 wt. % for a total weight of the (meth)acrylic based polymeric component A. It will be appreciated that the content of the monomer component a2 in the (meth)acrylic based polymeric component A may be within a range between any of the minimum and maximum values noted above. It will be further appreciated that the content of the content of the monomer component a2 in the (meth)acrylic based polymeric component A may be any value between any of the minimum and maximum values noted above.

According to certain embodiments, the pre-adhesive tackifier component may include C5, C9, C5/C9, dicyclopentadiene, terpene, or their hydrogenated resins, or combinations thereof.

According to yet other embodiments, the pre-adhesive mixture may include a particular content of the pre-adhesive tackifier component. For example, the content of the pre-adhesive tackifier component in the pre-adhesive mixture may be at least about at least about 0.1 wt. % for a total weight of the pre-adhesive mixture, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to yet other embodiments, the content of the pre-adhesive tackifier component in the pre-adhesive mixture may be not greater than about 30 wt. % for a total weight of the pre-adhesive mixture, such as, not greater than about 25 wt. % or not greater than about 20 wt. % or not greater than about 18 wt. % or not greater than about 15 wt. % or not greater than about 13 wt. % or not greater than about 11 wt. %. It will be appreciated that the content of the pre-adhesive tackifier component in the pre-adhesive mixture may be within a range between any of the minimum and maximum values noted above. It will be further appreciated that the content of the pre-adhesive tackifier component in the pre-adhesive mixture may be any value between any of the minimum and maximum values noted above.

Referring now to the adhesive formed according to embodiments described herein, the adhesive may include a particular adhesive composition. According to still other embodiments, the adhesive composition may include a macromonomer component, a (meth)acrylic based polymeric component A that is partially polymerized prior to being added to the adhesive composition, and a tackifier component.

According to particular embodiments, the macromonomer component may be referred to as having high glass transition temperature (Tg). According to still other embodiments, the macromonomer component may have a particular glass transition temperature (Tg) as estimated by the Fox Equation, based on the Tgs of the homopolymer of constituent monomers and the weight percent thereof. For example, the macromonomer component may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or at least about 80° C. or at least about 85° C. or at least about 95° C. or at least about 100° C. or at least about 105° C. or at least about 110° C. or at least about 115° C. or at least about 120° C. or at least about 125° C. or even at least about 130° C. It will be appreciated that the glass transition temperature of the macromonomer component may be within a range between any of the values noted above. It will be further appreciated that the glass transition temperature of the macromonomer component may be any value between any of the values noted above.

According to still other embodiments, the macromonomer component may have a particular molecular weight. For example, the macromonomer component may have a molecular weight of at least about 1,000 g/mol, such as, at least about 5,000 g/mol or at least about 10,000 g/mol or at least about 15,000 g/mol or at least about 20,000 g/mol or at least about 25,000 g/mol or at least about 30,000 g/mol. According to still other embodiments, the macromonomer component may have a molecular weight of not greater than about 100,000 g/mol, such as, not greater than about 75,000 g/mol or not greater than about 50,000 g/mol. It will be appreciated that the molecular weight of the macromonomer component may be within a range between any of the minimum and maximum values noted above. It will be further appreciated that the macromonomer component may be any value between any of the minimum and maximum values noted above.

According to yet other embodiments, the adhesive composition may include a particular content of the macromonomer component. For example, the content of the macromonomer component in the adhesive composition may be at least about 2.0 wt. % for a total weight of the adhesive composition, such as, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or even at least about 20.0 wt. %. According to still other embodiments, the content of the macromonomer component in the adhesive composition may be not greater than about 40.0 wt. % for a total weight of the, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or even not greater than about 25 wt. %. It will be appreciated that the content of the macromonomer component in the adhesive composition may be within a range between any of the minimum and maximum values noted above. It will be further appreciated that the content of the macromonomer component in the adhesive composition may be any value between any of the minimum and maximum values noted above.

According to still other embodiments, the macromonomer component may be advantageously synthesized through the use of reversible deactivation radical polymerization (RDRP) or controlled radical polymerization (CRP) techniques and contain a reactive functional group. Examples of these polymerization techniques include nitroxide mediated polymerization (NMP), reversible addition-fragmentation chain transfer polymerization (RAFT), atom transfer radical polymerization (ATRP), and cobalt mediated catalytic chain transfer polymerization (CCT). According to still other embodiments, the macromonomer component may comprise a (meth)acrylic monomer having a pendant alicyclic functional group, such as cyclohexyl acrylate, cyclohexyl methacrylate, isobornyl acrylate, isobornyl methacrylate, dicyclopentanyl acrylate, dicyclopentanyl methacrylate, 1-Adamantyl acrylate, 1-Adamantyl methacrylate. According to still other embodiments, the pre-adhesive macromonomer component may contain a terminal vinyl double bond. According to still other embodiments, the pre-adhesive macromonomer component may contain a terminal vinyl double bond. According to yet other embodiments, the macromonomer component may be capable of being polymerized in a free radical polymerization process.

According to particular embodiments, the (meth)acrylic based polymeric component A may be referred to as having a low glass transition temperature (Tg). According to yet other embodiments, the (meth)acrylic based polymeric component A may have a particular glass transition temperature (Tg) as estimated by the Fox Equation, based on the Tgs of the homopolymer of constituent monomers and the weight percent thereof. For example, the (meth)acrylic based polymeric component A may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component A may be within a range between any of the values noted above. It will be further appreciated that the glass transition temperature of the (meth)acrylic based polymeric component A may be any value between any of the values noted above.

According to yet other embodiments, the adhesive composition may include a particular content of the (meth)acrylic based polymeric component A. For example, the content of the (meth)acrylic based polymeric component A in the adhesive composition may be at least about 50.0 wt. % for a total weight of the adhesive composition, such as, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or even at least about 77 wt. %. According to still other embodiments, the content of the (meth)acrylic based polymeric component A in the adhesive composition may be not greater than about 90.0 wt. % for a total weight of the adhesive composition, such as, not greater than about 88 wt. % or not greater than about 85 wt. % or not greater than about 83 wt. % or not greater than about 80 wt. % or even not greater than about 78 wt. %. It will be appreciated that the content of the (meth)acrylic based polymeric component A in the adhesive composition may be within a range between any of the minimum and maximum values noted above. It will be further appreciated that the content of the (meth)acrylic based polymeric component A in the adhesive composition may be any value between any of the minimum and maximum values noted above.

According to still other embodiments, the (meth)acrylic based polymeric component A may include a reaction product of a monomer component a1 and a monomer component a2.

According to certain embodiments, the monomer component a1 may be an ethylenically unsaturated monomer. According to certain embodiments, the ethylenically unsaturated monomer may be selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

According to still other embodiments, the monomer component a2 may be an acrylic ester. According to yet other embodiments, the monomer component a2 may be an acrylic ester having a formula $C=C(R^2)(COOR^1)$, where R1 is an alkyl group containing 1 to 24 carbons, and R2 is an H or methyl.

According to still other embodiments, the (meth)acrylic based polymeric component A may include a particular content of the monomer component a1. For example, the content of the monomer component a1 in the (meth)acrylic based polymeric component A may be at least about 0.1 wt. % for a total weight of the (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to yet other embodiments, the content of the monomer component a1 in the (meth)acrylic based polymeric component A may be not greater than about 10 wt. % for a total weight of the (meth)acrylic based polymeric component A, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the monomer component a1 in the (meth)acrylic based polymeric component A may be within a range between any of the minimum and maximum values noted above. It will be further appreciated that the content of the content of the monomer component a1 in the (meth)acrylic based polymeric component A may be any value between any of the minimum and maximum values noted above.

According to still other embodiments, the (meth)acrylic based polymeric component A may include a particular content of the monomer component a2. For example, the content of the monomer component a2 in the (meth)acrylic based polymeric component A may be at least about 80 wt. % for a total weight of the (meth)acrylic based polymeric component A, such as, at least about 82 wt. % or at least about 85 wt. % or at least about 87 wt. % or at least about 90 wt. % or at least about 92 wt. % or at least about 95 wt. % or at least about 97 wt. %. According to yet other embodiments, the content of the monomer component a2 in the (meth)acrylic based polymeric component A may be not greater than about 99.0 wt. % for a total weight of the (meth)acrylic based polymeric component A. It will be appreciated that the content of the monomer component a2 in the (meth)acrylic based polymeric component A may be within a range between any of the minimum and maximum values noted above. It will be further appreciated that the content of the content of the monomer component a2 in the (meth)acrylic based polymeric component A may be any value between any of the minimum and maximum values noted above.

According to certain embodiments, the tackifier component may include C5, C9, C5/C9, dicyclopentadiene, terpene, or their hydrogenated resins, or combinations thereof.

According to yet other embodiments, the adhesive composition may include a particular content of the tackifier component. For example, the content of the tackifier component in the adhesive composition may be at least about at least about 0.1 wt. % for a total weight of the adhesive composition, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to yet other embodiments, the content of the tackifier component in the adhesive composition may be not greater than about 30 wt. % for a total weight of the adhesive composition, such as, not greater than about 25 wt. % or not greater than about 20 wt. % or not greater than about 18 wt. % or not greater than about 15 wt. % or not greater than about 13 wt. % or not greater than about 11 wt. %. It will be appreciated that the content of the tackifier component in the adhesive composition may be within a range between any of the minimum and maximum values noted above. It will be further appreciated that the content of the tackifier component in the adhesive composition may be any value between any of the minimum and maximum values noted above.

Referring now to the adhesive formed according to embodiments described herein, the adhesive may include a particular adhesive structure. According to certain embodiments, the adhesive structure may include a graft copolymer. According to yet other embodiments, the graft copolymer of the adhesive structure may include a backbone portion and a graft side chain portion. According to still other embodiments, the backbone portion of the graft copolymer may include the (meth)acrylic based polymeric component A. According to yet other embodiments, the grafted side chain portion of the graft copolymer may include the macromonomer component. According to still other embodiments, the adhesive structure may be formed via radiation initiated polymerization.

According to still other embodiments, the adhesive formed according to embodiments described herein may be applied as an adhesive layer on a substrate to form a tape. According to more particular embodiments, the substrate of the tape may include any material selected from the group of polytetrafluoroethylene, polyethylene terephthalate, polyethylene, polypropylene, polyvinyl chloride, polyimide, polyethylene naphthalate, polyphenylene Sulfide, ethylene tetrafluoroethylene, fluorinated ethylene propylene, aluminum foil or combinations thereof.

Referring now to a monolayer foam tape, embodiments described herein may further be generally directed to a monolayer foam tape that includes the adhesive formed according to embodiments described herein.

Figure 2:
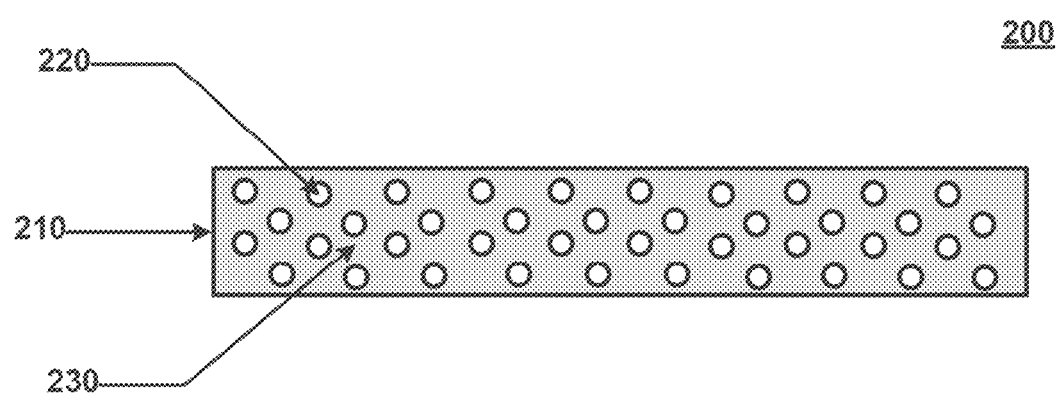
FIG. 2 includes an illustration showing the configuration of a monolayer foam tape formed according to embodiments described herein.

For purposes of illustration, FIG. 2 includes an illustration showing the configuration of a monolayer foam tape 200 formed according to embodiments described herein. As shown in FIG. 2, the monolayer foam tape 200 may include a foam core 210. The foam core 210 may include hollow microspheres 220 within an adhesive 230.

According to certain embodiments, the monolayer foam tape 200 may have a particular thickness. For example, the monolayer foam tape 200 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the monolayer foam tape 200 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the monolayer foam tape 200 may be within a range between any of the minimum and maximum values noted above. It will be further appreciated that the thickness of the monolayer foam tape 200 may be any value between any of the minimum and maximum values noted above.

According to certain embodiments, the foam core 210 may have a particular thickness. For example, the foam core 210 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the foam core 210 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the foam core 210 may be within a range between any of the minimum and maximum values noted above. It will be further appreciated that the thickness of the foam core 210 may be any value between any of the minimum and maximum values noted above.

According to particular embodiments, the hollow microspheres 220 may be a particular material. For example, the hollow microspheres 220 may be glass beads. According to still other embodiments, the hollow microspheres 220 may be polymeric microspheres. According to yet other embodiments, the hollow microspheres 220 may be a combination of glass beads and polymeric microspheres.

Referring now to the adhesive 230 formed according to embodiments described herein, the adhesive 230 may include a particular adhesive composition. According to still other embodiments, the adhesive composition of the adhesive 230 may include a macromonomer component, a (meth) acrylic based polymeric component A that is partially polymerized prior to being added to the adhesive composition of the adhesive 230, and a tackifier component.

According to particular embodiments, the macromonomer component may be referred to as having high glass transition temperature (Tg). According to still other embodiments, the macromonomer component may have a particular glass transition temperature (Tg) as estimated by the Fox Equation, based on the Tgs of the homopolymer of constituent monomers and the weight percent thereof. For example, the macromonomer component may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or at least about 80° C. or at least about 85° C. or at least about 95° C. or at least about 100° C. or at least about 105° C. or at least about 110° C. or at least about 115° C. or at least about 120° C. or at least about 125° C. or even at least about 130° C. It will be appreciated that the glass transition temperature of the macromonomer component may be within a range between any of the values noted above. It will be further appreciated that the glass transition temperature of the macromonomer component may be any value between any of the values noted above.

According to still other embodiments, the macromonomer component may have a particular molecular weight. For example, the macromonomer component may have a molecular weight of at least about 1,000 g/mol, such as, at least about 5,000 g/mol or at least about 10,000 g/mol or at least about 15,000 g/mol or at least about 20,000 g/mol or at least about 25,000 g/mol or at least about 30,000 g/mol. According to still other embodiments, the macromonomer component may have a molecular weigh of not greater than about 100,000 g/mol, such as, not greater than about 75,000 g/mol or not greater than about 50,000 g/mol. It will be appreciated that the molecular weight of the macromonomer component may be within a range between any of the minimum and maximum values noted above. It will be further appreciated that the macromonomer component may be any value between any of the minimum and maximum values noted above.

According to yet other embodiments, the adhesive composition of the adhesive 230 may include a particular content of the macromonomer component. For example, the content of the macromonomer component in the adhesive composition of the adhesive 230 may be at least about 2.0 wt. % for a total weight of the adhesive composition of the adhesive 230, such as, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or even at least about 20.0 wt. %. According to still other embodiments, the content of the macromonomer component in the adhesive composition of the adhesive 230 may be not greater than about 40.0 wt. % for a total weight of the, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or even not greater than about 25 wt. %. It will be appreciated that the content of the macromonomer component in the adhesive composition of the adhesive 230 may be within a range between any of the minimum and maximum values noted above. It will be further appreciated that the content of the macromonomer component in the adhesive composition of the adhesive 230 may be any value between any of the minimum and maximum values noted above.

According to still other embodiments, the macromonomer component may be advantageously synthesized through the use of reversible deactivation radical polymerization (RDRP) or controlled radical polymerization (CRP) techniques and contain a reactive functional group. Examples of these polymerization techniques include nitroxide mediated polymerization (NMP), reversible addition-fragmentation chain transfer polymerization (RAFT), atom transfer radical polymerization (ATRP), and cobalt mediated catalytic chain transfer polymerization (CCT). According to still other embodiments, the macromonomer component may comprise a (meth)acrylic monomer having a pendant alicyclic functional group, such as cyclohexyl acrylate, cyclohexyl methacrylate, isobornyl acrylate, isobornyl methacrylate, dicyclopentanyl acrylate, dicyclopentanyl methacrylate, 1-Adamantyl acrylate, 1-Adamantyl methacrylate. According to still other embodiments, the pre-adhesive macromonomer component may contain a terminal vinyl double bond. According to still other embodiments, the pre-adhesive macromonomer component may contain a terminal vinyl double bond. According to yet other embodiments, the macromonomer component may be capable of being polymerized in a free radical polymerization process.

According to particular embodiments, the (meth)acrylic based polymeric component A may be referred to as having a low glass transition temperature (Tg). According to yet other embodiments, the (meth)acrylic based polymeric component A may have a particular glass transition temperature (Tg) as estimated by the Fox Equation, based on the Tgs of the homopolymer of constituent monomers and the weight percent thereof. For example, the (meth)acrylic based polymeric component A may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the (meth)acrylic based polymeric component A may be within a range between any of the values noted above. It will be further appreciated that the glass transition temperature of the (meth)acrylic based polymeric component A may be any value between any of the values noted above.

According to yet other embodiments, the adhesive composition of the adhesive 230 may include a particular content of the (meth)acrylic based polymeric component A. For example, the content of the (meth)acrylic based polymeric component A in the adhesive composition of the adhesive 230 may be at least about 50.0 wt. % for a total weight of the adhesive composition of the adhesive 230, such as, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or even at least about 77 wt. %. According to still other embodiments, the content of the (meth)acrylic based polymeric component A in the adhesive composition of the adhesive 230 may be not greater than about 90.0 wt. % for a total weight of the adhesive composition of the adhesive 230, such as, not greater than about 88 wt. % or not greater than about 85 wt. % or not greater than about 83 wt. % or not greater than about 80 wt. % or even not greater than about 78 wt. %. It will be appreciated that the content of the (meth)acrylic based polymeric component A in the adhesive composition of the adhesive 230 may be within a range between any of the minimum and maximum values noted above. It will be further appreciated that the content of the (meth)acrylic based polymeric component A in the adhesive composition of the adhesive 230 may be any value between any of the minimum and maximum values noted above.

According to still other embodiments, the (meth)acrylic based polymeric component A may include a reaction product of a monomer component a1 and a monomer component a2.

According to certain embodiments, the monomer component a1 may be an ethylenically unsaturated monomer. According to certain embodiments, the ethylenically unsaturated monomer may be selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

According to still other embodiments, the monomer component a2 may be an acrylic ester. According to yet other embodiments, the monomer component a2 may be an acrylic ester having a formula $C=C(R^2)(COOR^1)$, where R1 is an alkyl group containing 1 to 24 carbons, and R2 is an H or methyl.

According to still other embodiments, the (meth)acrylic based polymeric component A may include a particular content of the monomer component a1. For example, the content of the monomer component a1 in the (meth)acrylic based polymeric component A may be at least about 0.1 wt. % for a total weight of the (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to yet other embodiments, the content of the monomer component a1 in the (meth)acrylic based polymeric component A may be not greater than about 10 wt. % for a total weight of the (meth)acrylic based polymeric component A, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the monomer component a1 in the (meth)acrylic based polymeric component A may be within a range between any of the minimum and maximum values noted above. It will be further appreciated that the content of the content of the monomer component a1 in the (meth)acrylic based polymeric component A may be any value between any of the minimum and maximum values noted above.

According to still other embodiments, the (meth)acrylic based polymeric component A may include a particular content of the monomer component a2. For example, the content of the monomer component a2 in the (meth)acrylic based polymeric component A may be at least about 80 wt. % for a total weight of the (meth)acrylic based polymeric component A, such as, at least about 82 wt. % or at least about 85 wt. % or at least about 87 wt. % or at least about 90 wt. % or at least about 92 wt. % or at least about 95 wt. % or at least about 97 wt. %. According to yet other embodiments, the content of the monomer component a2 in the (meth)acrylic based polymeric component A may be not greater than about 99.0 wt. % for a total weight of the (meth)acrylic based polymeric component A. It will be appreciated that the content of the monomer component a2 in the (meth)acrylic based polymeric component A may be within a range between any of the minimum and maximum values noted above. It will be further appreciated that the content of the content of the monomer component a2 in the (meth)acrylic based polymeric component A may be any value between any of the minimum and maximum values noted above.

According to certain embodiments, the tackifier component may include C5, C9, C5/C9, dicyclopentadiene, terpene, or their hydrogenated resins, or combinations thereof.

According to yet other embodiments, the adhesive composition of the adhesive 230 may include a particular content of the tackifier component. For example, the content of the tackifier component in the adhesive composition of the adhesive 230 may be at least about at least about 0.1 wt. % for a total weight of the adhesive composition of the adhesive 230, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to yet other embodiments, the content of the tackifier component in the adhesive composition of the adhesive 230 may be not greater than about 30 wt. % for a total weight of the adhesive composition of the adhesive 230, such as, not greater than about 25 wt. % or not greater than about 20 wt. % or not greater than about 18 wt. % or not greater than about 15 wt. % or not greater than about 13 wt. % or not greater than about 11 wt. %. It will be appreciated that the content of the tackifier component in the adhesive composition of the adhesive 230 may be within a range between any of the minimum and maximum values noted above. It will be further appreciated that the content of the tackifier component in the adhesive composition of the adhesive 230 may be any value between any of the minimum and maximum values noted above.

Referring further to the adhesive 230 formed according to embodiments described herein, the adhesive 230 may include a particular adhesive structure. According to certain embodiments, the adhesive structure of the adhesive 230 may include a graft copolymer. According to yet other embodiments, the graft copolymer of the adhesive structure may include a backbone portion and a graft side chain portion. According to still other embodiments, the backbone portion of the graft copolymer may include the (meth)acrylic based polymeric component A. According to yet other embodiments, the grafted side chain portion of the graft copolymer may include the macromonomer component. According to still other embodiments, the adhesive structure of the adhesive 230 may be formed via radiation initiated polymerization.

Referring now to a foam tape, embodiments described herein may further be generally directed to a foam tape that includes a foam core and at least a first adhesive layer of a first adhesive overlying a first surface of the foam core where the first adhesive includes the adhesive composition and adhesive structure formed according to embodiments described herein.

Figure 3:
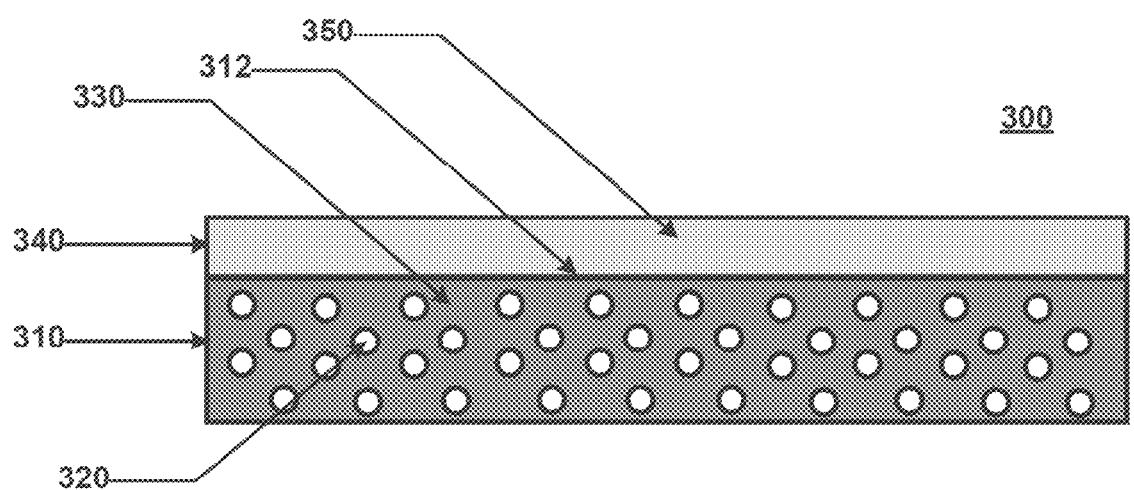
FIG. 3 includes an illustration showing the configuration of a foam tape having a single adhesive layer formed according to embodiments described herein.

For purposes of illustration, FIG. 3 includes an illustration showing the configuration of a foam tape 300 formed according to embodiments described herein. Foam tape 300 may include a foam core 310 and a first adhesive layer 340 of an adhesive 350 overlying a first surface 312 of the foam core 310. The foam core 310 may include hollow microspheres 320 within a foam material 330.

According to certain embodiments, the foam tape 300 may have a particular thickness. For example, the foam tape 300 may have a thickness of at least about 0.10 mm, such as, at least about 0.15 mm or at least about 0.2 mm or at least about 0.25 mm or at least about 0.3 mm or at least about 0.35 mm or at least about 0.4 mm or at least about 0.45 mm or even at least about 0.5 mm. It will be appreciated that the thickness of the foam tape 300 may be within a range between any of the values noted above. It will be further appreciated that the thickness of the foam tape 300 may be any value between any of the values noted above.

According to certain embodiments, the foam core 310 may have a particular thickness. For example, the foam core 310 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the foam core 310 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the foam core 310 may be within a range between any of the minimum and maximum values noted above. It will be further appreciated that the thickness of the foam core 310 may be any value between any of the minimum and maximum values noted above.

According to particular embodiments, the hollow microspheres 320 may be a particular material. For example, the hollow microspheres 320 may be glass beads. According to still other embodiments, the hollow microspheres 320 may be polymeric microspheres. According to yet other embodiments, the hollow microspheres 320 may be a combination of glass beads and polymeric microspheres.

According to still other embodiments, the foam material 330 may be a particular material. For example, the foam material 330 may be an acrylic material. According to still other embodiments, the foam material 330 may be a polyurethane material. According to yet other embodiments, the foam material 330 may be a polyethylene material. According to still other embodiments, the foam material 330 may be a PVC material. According to other embodiments, the foam material 330 may be any combination an acrylic material, a polyurethane material, a polyethylene material, or a PVC material.

According to still other embodiments, the foam material 330 may be an acrylic foam. According to yet other embodiments, the foam material 330 may be a polyurethane foam.

According to certain embodiments, the first adhesive layer 340 may have a particular thickness. For example, the first adhesive layer 340 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the first adhesive layer 340 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the first adhesive layer 340 may be within a range between any of the minimum and maximum values noted above. It will be further appreciated that the thickness of the first adhesive layer 340 may be any value between any of the minimum and maximum values noted above.

Referring now to the first adhesive 350 of the first adhesive layer 340 formed according to embodiments described herein, the first adhesive 350 may include a particular first adhesive composition. According to still other embodiments, the adhesive composition of the first adhesive 350 may include a first macromonomer component, a first (meth)acrylic based polymeric component A, and a first tackifier component.

According to particular embodiments, the first macromonomer component may be referred to as having high glass transition temperature (Tg). According to still other embodiments, the first macromonomer component may have a particular glass transition temperature (Tg) as estimated by the Fox Equation, based on the Tgs of the homopolymer of constituent monomers and the weight percent thereof. For example, the first macromonomer component may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or at least about 80° C. or at least about 85° C. or at least about 95° C. or at least about 100° C. or at least about 105° C. or at least about 110° C. or at least about 115° C. or at least about 120° C. or at least about 125° C. or even at least about 130° C. It will be appreciated that the glass transition temperature of the first macromonomer component may be within a range between any of the values noted above. It will be further appreciated that the glass transition temperature of the first macromonomer component may be any value between any of the values noted above.

According to still other embodiments, the first macromonomer component may have a particular molecular weight. For example, the first macromonomer component may have a molecular weight of at least about 1,000 g/mol, such as, at least about 5,000 g/mol or at least about 10,000 g/mol or at least about 15,000 g/mol or at least about 20,000 g/mol or at least about 25,000 g/mol or at least about 30,000 g/mol. According to still other embodiments, the first macromonomer component may have a molecular weight of not greater than about 100,000 g/mol, such as, not greater than about 75,000 g/mol or not greater than about 50,000 g/mol. It will be appreciated that the molecular weight of the first macromonomer component may be within a range between any of the minimum and maximum values noted above. It will be further appreciated that the first macromonomer component may be any value between any of the minimum and maximum values noted above.

According to yet other embodiments, the first adhesive composition of the first adhesive 350 may include a particular content of the first macromonomer component. For example, the content of the first macromonomer component in the first adhesive composition of the first adhesive 350 may be at least about 2.0 wt. % for a total weight of the first adhesive composition of the first adhesive 350, such as, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or even at least about 20.0 wt. %. According to still other embodiments, the content of the first macromonomer component in the first adhesive composition of the first adhesive 350 may be not greater than about 40.0 wt. % for a total weight of the, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or even not greater than about 25 wt. %. It will be appreciated that the content of the first macromonomer component in the first adhesive composition of the first adhesive 350 may be within a range between any of the minimum and maximum values noted above. It will be further appreciated that the content of the first macromonomer component in the first adhesive composition of the first adhesive 350 may be any value between any of the minimum and maximum values noted above.

According to still other embodiments, the first macromonomer component may be advantageously synthesized through the use of reversible deactivation radical polymerization (RDRP) or controlled radical polymerization (CRP) techniques and contain a reactive functional group. Examples of these polymerization techniques include nitroxide mediated polymerization (NMP), reversible addition-fragmentation chain transfer polymerization (RAFT), atom transfer radical polymerization (ATRP), and cobalt mediated catalytic chain transfer polymerization (CCT). According to still other embodiments, the first macromonomer component may comprise a (meth)acrylic monomer having a pendant alicyclic functional group, such as cyclohexyl acrylate, cyclohexyl methacrylate, isobornyl acrylate, isobornyl methacrylate, dicyclopentanyl acrylate, dicyclopentanyl methacrylate, 1-Adamantyl acrylate, 1-Adamantyl methacrylate. According to still other embodiments, the pre-adhesive macromonomer component may contain a terminal vinyl double bond. According to still other embodiments, the pre-adhesive macromonomer component may contain a terminal vinyl double bond. According to yet other embodiments, the first macromonomer component may be capable of being polymerized in a free radical polymerization process.

According to particular embodiments, the first (meth)acrylic based polymeric component A may be referred to as having a low glass transition temperature (Tg). According to yet other embodiments, the first (meth)acrylic based polymeric component A may have a particular glass transition temperature (Tg) as estimated by the Fox Equation, based on the Tgs of the homopolymer of constituent monomers and the weight percent thereof. For example, the first (meth)acrylic based polymeric component A may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the first (meth)acrylic based polymeric component A may be within a range between any of the values noted above. It will be further appreciated that the glass transition temperature of the first (meth)acrylic based polymeric component A may be any value between any of the values noted above.

According to yet other embodiments, the first adhesive composition of the first adhesive 350 may include a particular content of the first (meth)acrylic based polymeric component A. For example, the content of the first (meth)acrylic based polymeric component A in the first adhesive composition of the first adhesive 350 may be at least about 50.0 wt. % for a total weight of the first adhesive composition of the first adhesive 350, such as, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or even at least about 77 wt. %. According to still other embodiments, the content of the first (meth)acrylic based polymeric component A in the first adhesive composition of the first adhesive 350 may be not greater than about 90.0 wt. % for a total weight of the first adhesive composition of the first adhesive 350, such as, not greater than about 88 wt. % or not greater than about 85 wt. % or not greater than about 83 wt. % or not greater than about 80 wt. % or even not greater than about 78 wt. %. It will be appreciated that the content of the first (meth)acrylic based polymeric component A in the first adhesive composition of the first adhesive 350 may be within a range between any of the minimum and maximum values noted above. It will be further appreciated that the content of the first (meth)acrylic based polymeric component A in the first adhesive composition of the first adhesive 350 may be any value between any of the minimum and maximum values noted above.

According to still other embodiments, the first (meth)acrylic based polymeric component A may include a reaction product of a first monomer component a1 and a first monomer component a2.

According to certain embodiments, the first monomer component a1 may be an ethylenically unsaturated monomer. According to certain embodiments, the ethylenically unsaturated monomer may be selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

According to still other embodiments, the first monomer component a2 may be an acrylic ester. According to yet other embodiments, the first monomer component a2 may be an acrylic ester having a formula $C=C(R^2)(COOR^1)$, where R1 is an alkyl group containing 1 to 24 carbons, and R2 is an H or methyl.

According to still other embodiments, the first (meth)acrylic based polymeric component A may include a particular content of the first monomer component a1. For example, the content of the first monomer component a1 in the first (meth)acrylic based polymeric component A may be at least about 0.1 wt. % for a total weight of the first (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to yet other embodiments, the content of the first monomer component a1 in the first (meth)acrylic based polymeric component A may be not greater than about 10 wt. % for a total weight of the first (meth)acrylic based polymeric component A, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the first monomer component a1 in the first (meth)acrylic based polymeric component A may be within a range between any of the minimum and maximum values noted above. It will be further appreciated that the content of the content of the first monomer component a1 in the first (meth)acrylic based polymeric component A may be any value between any of the minimum and maximum values noted above.

According to still other embodiments, the first (meth)acrylic based polymeric component A may include a particular content of the first monomer component a2. For example, the content of the first monomer component a2 in the first (meth)acrylic based polymeric component A may be at least about 80 wt. % for a total weight of the first (meth)acrylic based polymeric component A, such as, at least about 82 wt. % or at least about 85 wt. % or at least about 87 wt. % or at least about 90 wt. % or at least about 92 wt. % or at least about 95 wt. % or at least about 97 wt. %. According to yet other embodiments, the content of the first monomer component a2 in the first (meth)acrylic based polymeric component A may be not greater than about 99.0 wt. % for a total weight of the first (meth)acrylic based polymeric component A. It will be appreciated that the content of the first monomer component a2 in the first (meth)acrylic based polymeric component A may be within a range between any of the minimum and maximum values noted above. It will be further appreciated that the content of the content of the first monomer component a2 in the first (meth)acrylic based polymeric component A may be any value between any of the minimum and maximum values noted above.

According to certain embodiments, the first tackifier component may include C5, C9, C5/C9, dicyclopentadiene, terpene, or their hydrogenated resins, or combinations thereof.

According to yet other embodiments, the first adhesive composition of the first adhesive 350 may include a particular content of the first tackifier component. For example, the content of the first tackifier component in the first adhesive composition of the first adhesive 350 may be at least about at least about 0.1 wt. % for a total weight of the first adhesive composition of the first adhesive 350, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to yet other embodiments, the content of the first tackifier component in the first adhesive composition of the first adhesive 350 may be not greater than about 30 wt. % for a total weight of the first adhesive composition of the first adhesive 350, such as, not greater than about 25 wt. % or not greater than about 20 wt. % or not greater than about 18 wt. % or not greater than about 15 wt. % or not greater than about 13 wt. % or not greater than about 11 wt. %. It will be appreciated that the content of the first tackifier component in the first adhesive composition of the first adhesive 350 may be within a range between any of the minimum and maximum values noted above. It will be further appreciated that the content of the first tackifier component in the first adhesive composition of the first adhesive 350 may be any value between any of the minimum and maximum values noted above.

Referring further to the first adhesive 350 formed according to embodiments described herein, the first adhesive 350 may include a particular first adhesive structure. According to certain embodiments, the first adhesive structure of the first adhesive 350 may include a graft copolymer. According to yet other embodiments, the graft copolymer of the first adhesive structure may include a backbone portion and a graft side chain portion. According to still other embodiments, the backbone portion of the graft copolymer may include the first (meth)acrylic based polymeric component A. According to yet other embodiments, the grafted side chain portion of the graft copolymer may include the first macromonomer component. According to still other embodiments, the first adhesive structure of the first adhesive 350 may be formed via radiation initiated polymerization.

Figure 4:
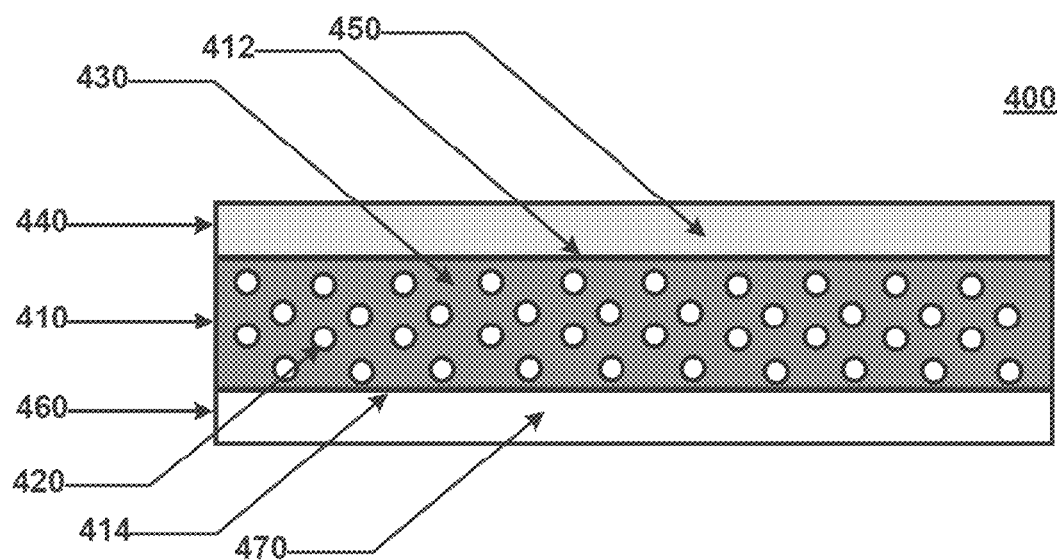
FIG. 4 includes an illustration showing the configuration of a foam tape having two adhesive layers formed according to embodiments described herein.

For purposes of illustration, FIG. 4 includes an illustration showing the configuration of a foam tape 400 formed according to embodiments described herein. Foam tape 400 may include a foam core 410, a first adhesive layer 440 of a first adhesive 450 overlying a first surface 412 of the foam core 410 and a second adhesive layer 460 of a second adhesive 470 overlying a second surface 414 of the foam core 410. The foam core 410 may include hollow microspheres 420 within a foam material 430.

It will be appreciated that the foam tape 400 and all components described in reference to the foam tape 400 as shown in FIG. 4 may have any of the characteristics described herein with reference to corresponding components shown in FIG. 3. In particular, the characteristic of foam tape 400, the foam core 410, the hollow microspheres 420, the foam material 430, the first adhesive layer 440 and the first adhesive 450 shown in FIG. 4 may have any of the corresponding characteristics described herein in reference to foam tape 300, the foam core 310, the hollow microspheres 320, the foam material 330, the first adhesive layer 340 and the first adhesive composition 350 shown in FIG. 3.

According to certain embodiments, the second adhesive layer 460 may have a particular thickness. For example, the second adhesive layer 460 may have a thickness of at least about 0.125 mm, such as, at least about 0.13 mm or at least about 0.135 mm or at least about 0.14 mm or at least about 0.145 mm or at least about 0.15 mm or at least about 0.155 mm or at least about 0.16 mm or at least about 0.165 mm or at least about 0.17 mm or at least about 0.175 mm or even at least about 0.18 mm. According to still other embodiments, the second adhesive layer 360 may have a thickness of not greater than about 0.25 mm, such as, not greater than about 0.245 mm of not greater than about 0.24 mm or not greater than about 0.235 mm or not greater than about 0.23 mm or not greater than about 0.225 mm or not greater than about 0.22 mm or not greater than about 0.215 mm or not greater than about 0.21 mm or not greater than about 0.205 mm or not greater than about 0.20 mm or not greater than about 0.195 mm or not greater than about 0.19 mm or not greater than about 0.185 mm. It will be appreciated that the thickness of the second adhesive layer 460 may be within a range between any of the minimum and maximum values noted above. It will be further appreciated that the thickness of the second adhesive layer 460 may be any value between any of the minimum and maximum values noted above.

Referring now to the second adhesive 470 of the second adhesive layer 460 formed according to embodiments described herein, the second adhesive 470 may include a particular second adhesive composition. According to still other embodiments, the second adhesive composition of the second adhesive 470 may include a second macromonomer component, a second (meth)acrylic based polymeric component A, and a second tackifier component.

According to particular embodiments, the second macromonomer component may be referred to as having high glass transition temperature (Tg). According to still other embodiments, the second macromonomer component may have a particular glass transition temperature (Tg) as estimated by the Fox Equation, based on the Tgs of the homopolymer of constituent monomers and the weight percent thereof. For example, the second macromonomer component may have a glass transition temperature (Tg) of at least about 40° C., such as, at least about 45° C. or at least about 50° C. or at least about 55° C. or at least about 60° C. or at least about 65° C. or at least about 70° C. or at least about 75° C. or even at least about 80° C. or at least about 85° C. or at least about 95° C. or at least about 100° C. or at least about 105° C. or at least about 110° C. or at least about 115° C. or at least about 120° C. or at least about 125° C. or even at least about 130° C. It will be appreciated that the glass transition temperature of the second macromonomer component may be within a range between any of the values noted above. It will be further appreciated that the glass transition temperature of the second macromonomer component may be any value between any of the values noted above.

According to still other embodiments, the second macromonomer component may have a particular molecular weight. For example, the second macromonomer component may have a molecular weight of at least about 1,000 g/mol, such as, at least about 5,000 g/mol or at least about 10,000 g/mol or at least about 15,000 g/mol or at least about 20,000 g/mol or at least about 25,000 g/mol or at least about 30,000 g/mol. According to still other embodiments, the second macromonomer component may have a molecular weigh of not greater than about 100,000 g/mol, such as, not greater than about 75,000 g/mol or not greater than about 50,000 g/mol. It will be appreciated that the molecular weight of the second macromonomer component may be within a range between any of the minimum and maximum values noted above. It will be further appreciated that the second macromonomer component may be any value between any of the minimum and maximum values noted above.

According to yet other embodiments, the second adhesive composition of the second adhesive 470 may include a particular content of the second macromonomer component. For example, the content of the second macromonomer component in the second adhesive composition of the second adhesive 470 may be at least about 2.0 wt. % for a total weight of the second adhesive composition of the second adhesive 470, such as, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or even at least about 20.0 wt. %. According to still other embodiments, the content of the second macromonomer component in the second adhesive composition of the second adhesive 470 may be not greater than about 40.0 wt. % for a total weight of the, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or even not greater than about 25 wt. %. It will be appreciated that the content of the second macromonomer component in the second adhesive composition of the second adhesive 470 may be within a range between any of the minimum and maximum values noted above. It will be further appreciated that the content of the second macromonomer component in the second adhesive composition of the second adhesive 470 may be any value between any of the minimum and maximum values noted above.

According to still other embodiments, the second macromonomer component may be advantageously synthesized through the use of reversible deactivation radical polymerization (RDRP) or controlled radical polymerization (CRP) techniques and contain a reactive functional group. Examples of these polymerization techniques include nitroxide mediated polymerization (NMP), reversible addition-fragmentation chain transfer polymerization (RAFT), atom transfer radical polymerization (ATRP), and cobalt mediated catalytic chain transfer polymerization (CCT). According to still other embodiments, the second macromonomer component may comprise a (meth)acrylic monomer having a pendant alicyclic functional group, such as cyclohexyl acrylate, cyclohexyl methacrylate, isobornyl acrylate, isobornyl methacrylate, dicyclopentanyl acrylate, dicyclopentanyl methacrylate, 1-Adamantyl acrylate, 1-Adamantyl methacrylate. According to still other embodiments, the pre-adhesive macromonomer component may contain a terminal vinyl double bond. According to still other embodiments, the pre-adhesive macromonomer component may contain a terminal vinyl double bond. According to yet other embodiments, the second macromonomer component may be capable of being polymerized in a free radical polymerization process.

According to particular embodiments, the second (meth)acrylic based polymeric component A may be referred to as having a low glass transition temperature (Tg). According to yet other embodiments, the second (meth)acrylic based polymeric component A may have a particular glass transition temperature (Tg) as estimated by the Fox Equation, based on the Tgs of the homopolymer of constituent monomers and the weight percent thereof. For example, the second (meth)acrylic based polymeric component A may have a glass transition temperature (Tg) of not greater than about 20° C., such as, not greater than about 15° C. or not greater than about 10° C. or not greater than about 5° C. or even not greater than about 0° C. It will be appreciated that the glass transition temperature of the second (meth)acrylic based polymeric component A may be within a range between any of the values noted above. It will be further appreciated that the glass transition temperature of the second (meth)acrylic based polymeric component A may be any value between any of the values noted above.

According to yet other embodiments, the second adhesive composition of the second adhesive 470 may include a particular content of the second (meth)acrylic based polymeric component A. For example, the content of the second (meth)acrylic based polymeric component A in the second adhesive composition of the second adhesive 470 may be at least about 50.0 wt. % for a total weight of the second adhesive composition of the second adhesive 470, such as, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or even at least about 77 wt. %. According to still other embodiments, the content of the second (meth)acrylic based polymeric component A in the second adhesive composition of the second adhesive 470 may be not greater than about 90.0 wt. % for a total weight of the second adhesive composition of the second adhesive 470, such as, not greater than about 88 wt. % or not greater than about 85 wt. % or not greater than about 83 wt. % or not greater than about 80 wt. % or even not greater than about 78 wt. %. It will be appreciated that the content of the second (meth)acrylic based polymeric component A in the second adhesive composition of the second adhesive 470 may be within a range between any of the minimum and maximum values noted above. It will be further appreciated that the content of the second (meth)acrylic based polymeric component A in the second adhesive composition of the second adhesive 470 may be any value between any of the minimum and maximum values noted above.

According to still other embodiments, the second (meth)acrylic based polymeric component A may include a reaction product of a second monomer component a1 and a second monomer component a2.

According to certain embodiments, the second monomer component a1 may be an ethylenically unsaturated monomer. According to certain embodiments, the ethylenically unsaturated monomer may be selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

According to still other embodiments, the second monomer component a2 may be an acrylic ester. According to yet other embodiments, the second monomer component a2 may be an acrylic ester having a formula $C=C(R^2)(COOR^1)$, where R1 is an alkyl group containing 1 to 24 carbons, and R2 is an H or methyl.

According to still other embodiments, the second (meth)acrylic based polymeric component A may include a particular content of the second monomer component a1. For example, the content of the second monomer component a1 in the second (meth)acrylic based polymeric component A may be at least about 0.1 wt. % for a total weight of the second (meth)acrylic based polymeric component A, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to yet other embodiments, the content of the second monomer component a1 in the second (meth)acrylic based polymeric component A may be not greater than about 10 wt. % for a total weight of the second (meth)acrylic based polymeric component A, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the second monomer component a1 in the second (meth)acrylic based polymeric component A may be within a range between any of the minimum and maximum values noted above. It will be further appreciated that the content of the content of the second monomer component a1 in the second (meth)acrylic based polymeric component A may be any value between any of the minimum and maximum values noted above.

According to still other embodiments, the second (meth)acrylic based polymeric component A may include a particular content of the second monomer component a2. For example, the content of the second monomer component a2 in the second (meth)acrylic based polymeric component A may be at least about 80 wt. % for a total weight of the second (meth)acrylic based polymeric component A, such as, at least about 82 wt. % or at least about 85 wt. % or at least about 87 wt. % or at least about 90 wt. % or at least about 92 wt. % or at least about 95 wt. % or at least about 97 wt. %. According to yet other embodiments, the content of the second monomer component a2 in the second (meth)acrylic based polymeric component A may be not greater than about 99.0 wt. % for a total weight of the second (meth)acrylic based polymeric component A. It will be appreciated that the content of the second monomer component a2 in the second (meth)acrylic based polymeric component A may be within a range between any of the minimum and maximum values noted above. It will be further appreciated that the content of the content of the second monomer component a2 in the second (meth)acrylic based polymeric component A may be any value between any of the minimum and maximum values noted above.

According to certain embodiments, the second tackifier component may include C5, C9, C5/C9, dicyclopentadiene, terpene, or their hydrogenated resins, or combinations thereof.

According to yet other embodiments, the second adhesive composition of the second adhesive 470 may include a particular content of the second tackifier component. For example, the content of the second tackifier component in the second adhesive composition of the second adhesive 470 may be at least about at least about 0.1 wt. % for a total weight of the second adhesive composition of the second adhesive 470, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to yet other embodiments, the content of the second tackifier component in the second adhesive composition of the second adhesive 470 may be not greater than about 30 wt. % for a total weight of the second adhesive composition of the second adhesive 470, such as, not greater than about 25 wt. % or not greater than about 20 wt. % or not greater than about 18 wt. % or not greater than about 15 wt. % or not greater than about 13 wt. % or not greater than about 11 wt. %. It will be appreciated that the content of the second tackifier component in the second adhesive composition of the second adhesive 470 may be within a range between any of the minimum and maximum values noted above. It will be further appreciated that the content of the second tackifier component in the second adhesive composition of the second adhesive 470 may be any value between any of the minimum and maximum values noted above.

Referring further to the second adhesive 470 formed according to embodiments described herein, the second adhesive 470 may include a particular second adhesive structure. According to certain embodiments, the second adhesive structure of the second adhesive 470 may include a graft copolymer. According to yet other embodiments, the graft copolymer of the second adhesive structure may include a backbone portion and a graft side chain portion. According to still other embodiments, the backbone portion of the graft copolymer may include the second (meth)acrylic based polymeric component A. According to yet other embodiments, the grafted side chain portion of the graft copolymer may include the second macromonomer component. According to still other embodiments, the second adhesive structure of the second adhesive 470 may be formed via radiation initiated polymerization.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

An adhesive comprising an adhesive structure and an adhesive composition, wherein the adhesive structure comprises a graft copolymer and wherein the adhesive composition comprises: at least about 1 wt. % and not greater than 40 wt. % of a macromonomer component for a total weight of the adhesive composition; at least about 50 wt. % and not greater than about 98 wt. % of a (meth)acrylic based polymeric component A for a total weight of the adhesive composition; and at least about 0.1 wt. % and not greater than about 30 wt. % of a tackifier component for a total weight of the adhesive composition, wherein the macromonomer component has a weight-average molecular weight of at least 1000 g/mol, wherein the macromonomer component has a glass transition temperature of at least about 40° C., and wherein the (meth)acrylic based polymeric component A has a glass transition temperature (Tg) of not greater than about 20° C.

Embodiment 2

The adhesive of embodiment 1, wherein the graft copolymer of the adhesive structure comprises a backbone portion and a grafted side chain portion, wherein the backbone portion comprises the (meth)acrylic based polymeric component A, and wherein the grafted side chain portion comprises the macromonomer component.

Embodiment 3

The adhesive of any one of embodiments 1 and 2, wherein the graft copolymer of the adhesive structure is formed via radiation initiated polymerization.

Embodiment 4

The adhesive of any one of embodiments 1 and 2, wherein the (meth)acrylic based polymeric component A comprises a reaction product of polymerizable material comprising: at least about 0.1 wt. % and not greater than about 10 wt. % of a monomer component a1 for a total weight of the (meth)acrylic based polymeric component A, wherein the monomer component a1 comprises an ethylenically unsaturated functional monomer with a pendant hydrogen bonding group; and at least about 80 wt. % and not greater than about 99 wt. % of a monomer component a2 for a total weight of the (meth)acrylic based polymeric component A, wherein the monomer component a2 comprises an ethylenically unsaturated monomer.

Embodiment 5

The adhesive of embodiment 4, wherein the monomer component a1 comprises ethylenically unsaturated functional monomer selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

Embodiment 6

The adhesive of embodiment 4, wherein the monomer component a2 comprises an acrylic ester of the formula C=C(R2)(COOR1) where R1 is a alkyl group containing 1 to 24 carbons, and R2 is H or methyl.

Embodiment 7

The adhesive of any one of embodiments 1 and 2, wherein the macromonomer component comprises a (meth)acrylic monomer having a pendant alicyclic functional group, wherein said macromonomer component is capable of being polymerized in a free radical polymerization process.

Embodiment 8

The adhesive of any one of embodiments 1 and 2, wherein the tackifier component comprises C5, C9, C5/C9, dicyclopentadiene, terpene, or their hydrogenated resins, or combinations thereof.

Embodiment 9

The adhesive of any one of embodiments 1 and 2, wherein the adhesive composition comprises at least about 2.0 wt. % of the macromonomer component for a total weight of the adhesive composition, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 10

The adhesive of any one of embodiments 1 and 2, wherein the adhesive composition comprises not greater than about 40 wt. % of the macromonomer component for a total weight of the adhesive composition, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 11

The adhesive of any one of embodiments 1 and 2, wherein the adhesive composition comprises at least about 50 wt. % of the (meth)acrylic based polymeric component A, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. % or at least about 80 wt. %.

Embodiment 12

The adhesive of any one of embodiments 1 and 2, wherein the adhesive composition comprises not greater than about 90 wt. % of the (meth)acrylic based polymeric component A, not greater than about 88 wt. % or not greater than about 85 wt. % or not greater than about 83 wt. % or not greater than about 80 wt. % or not greater than about 78 wt. %.

Embodiment 13

The adhesive of any one of embodiments 1 and 2, wherein the adhesive composition comprises at least about 0.1 wt. % of the tackifier component for a total weight of the adhesive composition, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10 wt. %.

Embodiment 14

The adhesive of any one of embodiments 1 and 2, wherein the adhesive composition comprises not greater than about 30 wt. % of the tackifier component for a total weight of the adhesive composition, not greater than about 28 wt. % or not greater than about 25 wt. % or not greater than about 23 wt. % or not greater than about 20 wt. % or not greater than about 18 wt. % or not greater than about 15 wt. % not greater than about 13 wt. % or not greater than about 11 wt. %.

Embodiment 15

The adhesive of any one of embodiments 1 and 2, wherein the (meth)acrylic based polymeric component A comprises at least about 0.1 wt. % of the monomer component a1 for a total weight of the (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 16

The adhesive of any one of embodiments 1 and 2, wherein the (meth)acrylic based polymeric component A comprises not greater than about 10.0 wt. % of the monomer component a1 for a total weight of the (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 17

The adhesive of any one of embodiments 1 and 2, wherein the (meth)acrylic based polymeric component A comprises at least about 80 wt. % of the monomer component a2 for a total weight of the (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 18

The adhesive of any one of embodiments 1 and 2, wherein the (meth)acrylic based polymeric component A comprises not greater than about 99 wt. %.

Embodiment 19

A method of forming an adhesive, wherein the method comprises providing a pre-adhesive mixture comprising: at least about 1 wt. % and not greater than about 40 wt. % of a pre-adhesive macromonomer component for a total weight of the pre-adhesive mixture, wherein the pre-adhesive macromonomer component has a molecular weight of at least about 1000 g/mol, and a glass transition temperature of at least about 40° C.; at least about 50 wt. % and not greater than about 98 wt. % of a pre-adhesive (meth)acrylic based polymeric component A for a total weight of the pre-adhesive mixture, wherein the pre-adhesive (meth)acrylic based polymeric component A has a glass transition temperature (Tg) of not greater than about 20° C.; and at least about 0.1 wt. % and not greater than about 30 wt. % of a pre-adhesive tackifier component for a total weight of the pre-adhesive mixture; mixing the pre-adhesive mixture; and polymerizing the pre-adhesive mixture to form the adhesive, wherein the adhesive comprises an adhesive structure and an adhesive composition, wherein the adhesive structure comprises a graft copolymer.

Embodiment 20

The method of embodiment 19, wherein the pre-adhesive (meth)acrylic based polymeric component A comprises a reaction product of polymerizable material comprising: at least about 0.1 wt. % and not greater than about 10 wt. % of a pre-adhesive monomer component a1 for a total weight of the pre-adhesive (meth)acrylic based polymeric component A, wherein the pre-adhesive monomer component a1 comprises an ethylenically unsaturated functional monomer with a pendant hydrogen bonding group; and at least about 80 wt. % and not greater than about 99 wt. % of a pre-adhesive monomer component a2 for a total weight of the pre-adhesive (meth)acrylic based polymeric component A, wherein the pre-adhesive monomer component a2 comprises an ethylenically unsaturated monomer.

Embodiment 21

The method of embodiment 20, wherein the pre-adhesive monomer component a1 comprises an ethylenically unsaturated functional monomer selected from the group consisting of acid containing (meth)acrylic monomers (acrylic acid, methacrylic acid, 2-carboxyethyl acrylate, etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

Embodiment 22

The method of embodiment 20, wherein the pre-adhesive monomer component a2 comprises an acrylic ester having a formula C=C(R2)(COOR1) where R1 is a alkyl group containing 1 to 24 carbons, and R2 is H or methyl.

Embodiment 23

The method of embodiment 19, wherein the pre-adhesive macromonomer component comprises a (meth)acrylic monomer having a pendant alicyclic functional group, wherein said pre-adhesive macromonomer component is capable of being polymerized in a free radical polymerization process.

Embodiment 24

The method of embodiment 19, wherein the pre-adhesive tackifier component comprises C5, C9, C5/C9, dicyclopentadiene, terpene, or their hydrogenated resins, or combinations thereof.

Embodiment 25

The method of embodiment 19, wherein the pre-adhesive mixture comprises at least about 2.0 wt. % of the pre-adhesive macromonomer component for a total weight of the pre-adhesive mixture, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 26

The method of embodiment 19, wherein the pre-adhesive mixture comprises not greater than about 40 wt. % of the pre-adhesive macromonomer component for a total weight of the pre-adhesive mixture, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 27

The method of embodiment 19, wherein the pre-adhesive mixture comprises at least about 50 wt. % of the pre-adhesive (meth)acrylic based polymeric component A, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. %.

Embodiment 28

The method of embodiment 19, wherein the pre-adhesive mixture comprises not greater than about 90 wt. % of the pre-adhesive (meth)acrylic based polymeric component A, not greater than about 88 wt. % or not greater than about 85 wt. % or not greater than about 83 wt. % or not greater than about 80 wt. % or not greater than about 78 wt. %.

Embodiment 29

The method of embodiment 19, wherein the pre-adhesive mixture comprises at least about 0.1 wt. % of the pre-adhesive tackifier component for a total weight of the pre-adhesive mixture, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10.0 wt. %.

Embodiment 30

The method of embodiment 19, wherein the pre-adhesive mixture comprises not greater than about 30 wt. % of the pre-adhesive mixture tackifier component for a total weight of the pre-adhesive mixture, not greater than about 28 wt. % or not greater than about 25 wt. % or not greater than about 23 wt. % or not greater than about 20 wt. % or not greater than about 18 wt. % or not greater than about 15 wt. % or not greater than about 13 wt. % or not greater than about 11 wt. %.

Embodiment 31

The method of embodiment 20, wherein the pre-adhesive (meth)acrylic based polymeric component A comprises at least about 0.1 wt. % of the pre-adhesive monomer component a1 for a total weight of the pre-adhesive (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 32

The method of embodiment 20, wherein the pre-adhesive (meth)acrylic based polymeric component A comprises not greater than about 10.0 wt. % of the pre-adhesive monomer component a1 for a total weight of the pre-adhesive (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 33

The method of embodiment 20, wherein the pre-adhesive (meth)acrylic based polymeric component A comprises at least about 80 wt. % of the pre-adhesive monomer component a2 for a total weight of the pre-adhesive (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 34

The method of embodiment 20, wherein the pre-adhesive (meth)acrylic based polymeric component A comprises not greater than about 99 wt. % of the pre-adhesive monomer component a2 for a total weight of the pre-adhesive (meth)acrylic based polymeric component A.

Embodiment 35

The method of embodiment 19, wherein the adhesive composition comprises: at least about 1 wt. % and not greater than 40 wt. % of a macromonomer component for a total weight of the adhesive composition; at least about 50 wt. % and not greater than about 98 wt. % of a (meth)acrylic based polymeric component A for a total weight of the adhesive composition; and at least about 0.1 wt. % and not greater than about 30 wt. % of a tackifier component for a total weight of the adhesive composition, wherein the macromonomer component has a weight-average molecular weight of at least 1000 g/mol, wherein the macromonomer component has a glass transition temperature of at least about 40° C., and wherein the (meth)acrylic based polymeric component A has a glass transition temperature (Tg) of not greater than about 20° C.

Embodiment 36

The method of embodiment 35, wherein the graft copolymer of the adhesive structure comprises a backbone portion and a grafted side chain portion, wherein the backbone portion comprising the (meth)acrylic based polymeric component A, and wherein the grafted side chain portion comprises the macromonomer component.

Embodiment 37

The method of embodiment 35, wherein the graft copolymer of the adhesive structure is formed via radiation initiated polymerization.

Embodiment 38

The method of embodiment 35, wherein the (meth)acrylic based polymeric component A comprises a reaction product of polymerizable material comprising: at least about 0.1 wt. % and not greater than about 10 wt. % of a monomer component a1 for a total weight of the (meth)acrylic based polymeric component A, wherein the monomer component a1 comprises an ethylenically unsaturated functional monomer with a pendant hydrogen bonding group; and at least about 80 wt. % and not greater than about 99 wt. % of a monomer component a2 for a total weight of the (meth)acrylic based polymeric component A, wherein the monomer component a2 comprises an ethylenically unsaturated monomer.

Embodiment 39

The method of embodiment 38, wherein the monomer component a1 comprises ethylenically unsaturated functional monomer selected from the group consisting of acid containing (meth)acrylic monomers (acrylic acid, methacrylic acid, 2-carboxyethyl acrylate etc.), hydroxyl containing (meth)acrylic monomers (2-hydroxyethyl (meth)acrylate), a nitrogen containing monomer having a primary, secondary, or tertiary amino group, and a nitrogen containing monomer having a primary, secondary, or tertiary amido group.

Embodiment 40

The method of embodiment 38, wherein the monomer component a2 comprises an acrylic ester of the formula $C=C(R2)(COOR1)$ where R1 is a alkyl group containing 1 to 24 carbons, and R2 is H or methyl.

Embodiment 41

The method of embodiment 35, wherein the macromonomer component comprises a (meth)acrylic monomer having a pendant alicyclic functional group, wherein said macromonomer component is capable of being polymerized in a free radical polymerization process.

Embodiment 42

The method of embodiment 35, wherein the tackifier component comprises C5, C9, C5/C9, dicyclopentadiene, terpene, or their hydrogenated resins, or combinations thereof.

Embodiment 43

The method of embodiment 35, wherein the adhesive composition comprises at least about 2.0 wt. % of the macromonomer component for a total weight of the adhesive composition, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 44

The method of embodiment 35, wherein the adhesive composition comprises not greater than about 40 wt. % of the macromonomer component for a total weight of the adhesive composition, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 45

The method of embodiment 35, wherein the adhesive composition comprises at least about 50 wt. % of the (meth)acrylic based polymeric component A, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. % or at least about 80 wt. %.

Embodiment 46

The method of embodiment 35, wherein the adhesive composition comprises not greater than about 90 wt. % of the (meth)acrylic based polymeric component A, not greater than about 88 wt. % or not greater than about 85 wt. % or not greater than about 83 wt. % or not greater than about 80 wt. % or not greater than about 78 wt. %.

Embodiment 47

The method of embodiment 35, wherein the adhesive composition comprises at least about 0.1 wt. % of the tackifier component for a total weight of the adhesive composition, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10 wt. %.

Embodiment 48

The method of embodiment 35, wherein the adhesive composition comprises not greater than about 30 wt. % of the tackifier component for a total weight of the adhesive composition, not greater than about 28 wt. % or not greater than about 25 wt. % or not greater than about 23 wt. % or not greater than about 20 wt. % or not greater than about 18 wt. % or not greater than about 15 wt. % not greater than about 13 wt. % or not greater than about 11 wt. %.

Embodiment 49

The method of embodiment 38, wherein the (meth)acrylic based polymeric component A comprises at least about 0.1 wt. % of the monomer component a1 for a total weight of the (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 50

The method of embodiment 38, wherein the (meth)acrylic based polymeric component A comprises not greater than about 10.0 wt. % of the monomer component a1 for a total weight of the (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 51

The method of embodiment 38, wherein the (meth)acrylic based polymeric component A comprises at least about 80 wt. % of the monomer component a2 for a total weight of the (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 52

The method of embodiment 38, wherein the (meth)acrylic based polymeric component A comprises not greater than about 99 wt. %.

Embodiment 53

A monolayer foam tape comprising: a foam core comprising hollow microspheres within a adhesive, wherein the adhesive comprises an adhesive structure and an adhesive composition, wherein the adhesive structure comprises a graft copolymer and wherein the adhesive composition comprises: at least about 1 wt. % and not greater than 40 wt. % of a macromonomer component for a total weight of the adhesive composition; at least about 50 wt. % and not greater than about 98 wt. % of a (meth)acrylic based polymeric component A for a total weight of the adhesive composition; and at least about 0.1 wt. % and not greater than about 30 wt. % of a tackifier component for a total weight of the adhesive composition, wherein the macromonomer component has a weight-average molecular weight of at least 1000 g/mol, wherein the macromonomer component has a glass transition temperature of at least about 40° C., and wherein the (meth)acrylic based polymeric component A has a glass transition temperature (Tg) of not greater than about 20° C.

Embodiment 54

The monolayer foam tape of embodiment 53, wherein the graft copolymer of the adhesive structure comprises a backbone portion and a grafted side chain portion, wherein the backbone portion comprising the (meth)acrylic based polymeric component A, and wherein the grafted side chain portion comprises the macromonomer component.

Embodiment 55

The monolayer foam tape of embodiment 53, wherein the graft copolymer of the adhesive structure is formed via radiation initiated polymerization.

Embodiment 56

The monolayer foam tape of embodiment 53, wherein the (meth)acrylic based polymeric component A comprises a reaction product of polymerizable material comprising: at least about 0.1 wt. % and not greater than about 10 wt. % of a monomer component a1 for a total weight of the (meth) acrylic based polymeric component A, wherein the monomer component a1 comprises an ethylenically unsaturated functional monomer with a pendant hydrogen bonding group; and at least about 80 wt. % and not greater than about 99 wt. % of a monomer component a2 for a total weight of the (meth)acrylic based polymeric component A, wherein the monomer component a2 comprises an ethylenically unsaturated monomer.

Embodiment 57

The monolayer foam tape of embodiment 56, wherein the monomer component a1 comprises ethylenically unsaturated functional monomer selected from the group consisting of acid containing (meth)acrylic monomers (acrylic acid, methacrylic acid, 2-carboxyethyl acrylate etc.), hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

Embodiment 58

The monolayer foam tape of embodiment 56, wherein the monomer component a2 comprises an acrylic ester of the formula C=C(R2)(COOR1) where R1 is a alkyl group containing 1 to 24 carbons, and R2 is H or methyl.

Embodiment 59

The monolayer foam tape of embodiment 53, wherein the macromonomer component comprises a (meth)acrylic monomer having a pendant alicyclic functional group, wherein said macromonomer component is capable of being polymerized in a free radical polymerization process.

Embodiment 60

The monolayer foam tape of embodiment 53, wherein the tackifier component comprises C5, C9, C5/C9, dicyclopentadiene, terpene, or their hydrogenated resins, or combinations thereof.

Embodiment 61

The monolayer foam tape of embodiment 53, wherein the adhesive composition comprises at least about 2.0 wt. % of the macromonomer component for a total weight of the adhesive composition, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 62

The monolayer foam tape of embodiment 53, wherein the adhesive composition comprises not greater than about 40 wt. % of the macromonomer component for a total weight of the adhesive composition, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 63

The monolayer foam tape of embodiment 53, wherein the adhesive composition comprises at least about 50 wt. % of the (meth)acrylic based polymeric component A, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. % or at least about 80 wt. %.

Embodiment 64

The monolayer foam tape of embodiment 53, wherein the adhesive composition comprises not greater than about 90 wt. % of the (meth)acrylic based polymeric component A, not greater than about 88 wt. % or not greater than about 85 wt. % or not greater than about 83 wt. % or not greater than about 80 wt. % or not greater than about 78 wt. %.

Embodiment 65

The monolayer foam tape of embodiment 53, wherein the adhesive composition comprises at least about 0.1 wt. % of the tackifier component for a total weight of the adhesive composition, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt.

% or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10 wt. %.

Embodiment 66

The monolayer foam tape of embodiment 53, wherein the adhesive composition comprises not greater than about 30 wt. % of the tackifier component for a total weight of the adhesive composition, not greater than about 28 wt. % or not greater than about 25 wt. % or not greater than about 23 wt. % or not greater than about 20 wt. % or not greater than about 18 wt. % or not greater than about 15 wt. % not greater than about 13 wt. % or not greater than about 11 wt. %.

Embodiment 67

The monolayer foam tape of embodiment 56, wherein the (meth)acrylic based polymeric component A comprises at least about 0.1 wt. % of the monomer component a1 for a total weight of the (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 68

The monolayer foam tape of embodiment 56, wherein the (meth)acrylic based polymeric component A comprises not greater than about 10.0 wt. % of the monomer component a1 for a total weight of the (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 69

The monolayer foam tape of embodiment 56, wherein the (meth)acrylic based polymeric component A comprises at least about 80 wt. % of the monomer component a2 for a total weight of the (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 70

The monolayer foam tape of embodiment 56, wherein the (meth)acrylic based polymeric component A comprises not greater than about 99 wt. % of the monomer component a2 for a total weight of the (meth)acrylic based polymeric component A.

Embodiment 71

The monolayer foam tape of embodiment 53, wherein the monolayer foam tape has a thickness of at least about 0.125 mm.

Embodiment 72

The monolayer foam tape of embodiment 53, wherein the monolayer foam tape has a thickness of not greater than about 0.25 mm.

Embodiment 73

The monolayer foam tape of embodiment 53, wherein the hollow spheres comprise glass beads, polymeric microspheres or a combination thereof.

Embodiment 74

A foam tape comprising: a foam core comprising hollow microspheres within a foam material, and a first adhesive layer of a first adhesive overlying a first surface of the foam core, wherein the first adhesive comprises a first adhesive structure and a first adhesive composition, wherein the first adhesive structure comprises a graft copolymer and wherein the first adhesive composition comprises: at least about 1 wt. % and not greater than 40 wt. % of a first macromonomer component for a total weight of the first adhesive composition; at least about 50 wt. % and not greater than about 98 wt. % of a first (meth)acrylic based polymeric component A for a total weight of the first adhesive composition; and at least about 0.1 wt. % and not greater than about 30 wt. % of a first tackifier component for a total weight of the first adhesive composition, wherein the first macromonomer component has a weight-average molecular weight of at least 1000 g/mol, wherein the first macromonomer component has a glass transition temperature of at least about 40° C., and wherein the first (meth)acrylic based polymeric component A has a glass transition temperature (Tg) of not greater than about 20° C.

Embodiment 75

The foam tape of embodiment 74, wherein the graft copolymer of the first adhesive structure comprises a backbone portion and a grafted side chain portion, wherein the backbone portion comprises the first (meth)acrylic based polymeric component A, and wherein the grafted side chain portion comprises the first macromonomer component.

Embodiment 76

The foam tape of embodiment 74, wherein the graft copolymer of the first adhesive structure is formed via radiation initiated polymerization.

Embodiment 77

The foam tape of embodiment 74, wherein the first (meth)acrylic based polymeric component A comprises a reaction product of polymerizable material comprising: at least about 0.1 wt. % and not greater than about 10 wt. % of a first monomer component a1 for a total weight of the first (meth)acrylic based polymeric component A, wherein the first monomer component a1 comprises an ethylenically unsaturated functional monomer with a pendant hydrogen bonding group; and at least about 80 wt. % and not greater than about 99 wt. % of a first monomer component a2 for a total weight of the first (meth)acrylic based polymeric component A, wherein the first monomer component a2 comprises an ethylenically unsaturated monomer.

Embodiment 78

The foam tape of embodiment 77, wherein the first monomer component a1 comprises ethylenically unsaturated functional monomer selected from the group consisting of acid containing (meth)acrylic monomers (acrylic acid, methacrylic acid, 2-carboxyethyl acrylate etc.), hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

Embodiment 79

The foam tape of embodiment 77, wherein the first monomer component a2 comprises an acrylic ester of the formula C=C(R2)(COOR1) where R1 is a alkyl group containing 1 to 24 carbons, and R2 is H or methyl.

Embodiment 80

The foam tape of embodiment 74, wherein the first macromonomer component comprises a (meth)acrylic monomer having a pendant alicyclic functional group, wherein said macromonomer component is capable of being polymerized in a free radical polymerization process.

Embodiment 81

The foam tape of embodiment 74, wherein the first tackifier component comprises C5, C9, C5/C9, dicyclopentadiene, terpene, or their hydrogenated resins, or combinations thereof.

Embodiment 82

The foam tape of embodiment 74, wherein the first adhesive composition comprises at least about 2.0 wt. % of the first macromonomer component for a total weight of the first adhesive composition, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 83

The foam tape of embodiment 74, wherein the first adhesive composition comprises not greater than about 40 wt. % of the first macromonomer component for a total weight of the first adhesive composition, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 84

The foam tape of embodiment 74, wherein the first adhesive composition comprises at least about 50 wt. % of the first (meth)acrylic based polymeric component A for a total weight of the first adhesive composition, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. % or at least about 80 wt. %.

Embodiment 85

The foam tape of embodiment 74, wherein the first adhesive composition comprises not greater than about 90 wt. % of the first (meth)acrylic based polymeric component A for a total weight of the first adhesive composition, not greater than about 88 wt. % or not greater than about 85 wt. % or not greater than about 83 wt. % or not greater than about 80 wt. % or not greater than about 78 wt. %.

Embodiment 86

The foam tape of embodiment 74, wherein the first adhesive composition comprises at least about 0.1 wt. % of the first tackifier component for a total weight of the first adhesive composition, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10 wt. %.

Embodiment 87

The foam tape of embodiment 74, wherein the adhesive composition comprises not greater than about 30 wt. % of the first tackifier component for a total weight of the first adhesive composition, not greater than about 28 wt. % or not greater than about 25 wt. % or not greater than about 23 wt. % or not greater than about 20 wt. % or not greater than about 18 wt. % or not greater than about 15 wt. % not greater than about 13 wt. % or not greater than about 11 wt. %.

Embodiment 88

The foam tape of embodiment 77, wherein the first (meth)acrylic based polymeric component A comprises at least about 0.1 wt. % of the first monomer component a1 for a total weight of the first (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 89

The foam tape of embodiment 77, wherein the first (meth)acrylic based polymeric component A comprises not greater than about 10.0 wt. % of the first monomer component a1 for a total weight of the first (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 90

The foam tape of embodiment 77, wherein the first (meth)acrylic based polymeric component A comprises at least about 80 wt. % of the first monomer component a2 for a total weight of the first (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 91

The foam tape of embodiment 77, wherein the first (meth)acrylic based polymeric component A comprises not greater than about 99 wt. %.

Embodiment 92

The foam tape of embodiment 74, wherein the foam tape further comprises a second adhesive layer of a second adhesive overlying a second surface of the foam core, wherein the second adhesive comprises a second adhesive structure and a second adhesive composition, wherein the second adhesive structure comprises a graft copolymer and wherein the second adhesive composition comprises: at least about 1 wt. % and not greater than 40 wt. % of a second macromonomer component for a total weight of the second adhesive composition; at least about 50 wt. % and not greater than about 98 wt. % of a second (meth)acrylic based polymeric component A for a total weight of the second adhesive composition; and at least about 0.1 wt. % and not greater than about 30 wt. % of a second tackifier component for a total weight of the second adhesive composition, wherein the second macromonomer component has a weight-average molecular weight of at least 1000 g/mol, wherein the second macromonomer component has a glass transition temperature of at least about 40° C., and wherein the second (meth)acrylic based polymeric component A has a glass transition temperature (Tg) of not greater than about 20° C.

Embodiment 93

The foam tape of embodiment 92, wherein the graft copolymer of the second adhesive structure comprises a backbone portion and a grafted side chain portion, wherein the backbone portion comprises the second (meth)acrylic based polymeric component A, and wherein the grafted side chain portion comprises the second macromonomer component.

Embodiment 94

The foam tape of embodiment 92, wherein the graft copolymer of the second adhesive structure is formed via radiation initiated polymerization.

Embodiment 95

The foam tape of embodiment 92, wherein the second (meth)acrylic based polymeric component A comprises a reaction product of polymerizable material comprising: at least about 0.1 wt. % and not greater than about 10 wt. % of a second monomer component a1 for a total weight of the second (meth)acrylic based polymeric component A, wherein the second monomer component a1 comprises an ethylenically unsaturated functional monomer with a pendant hydrogen bonding group; and at least about 80 wt. % and not greater than about 99 wt. % of a second monomer component a2 for a total weight of the second (meth)acrylic based polymeric component A, wherein the second monomer component a2 comprises an ethylenically unsaturated monomer.

Embodiment 96

The foam tape of embodiment 95, wherein the second monomer component a1 comprises ethylenically unsaturated functional monomer selected from the group consisting of acid containing (meth)acrylic monomers (acrylic acid, methacrylic acid, 2-carboxyethyl acrylate etc.), hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

Embodiment 97

The foam tape of embodiment 95, wherein the second monomer component a2 comprises an acrylic ester of the formula C=C(R2)(COOR1) where R1 is a alkyl group containing 1 to 24 carbons, and R2 is H or methyl.

Embodiment 98

The foam tape of embodiment 92, wherein the second macromonomer component comprises a (meth)acrylic monomer having a pendant alicyclic functional group, wherein said macromonomer component is capable of being polymerized in a free radical polymerization process.

Embodiment 99

The foam tape of embodiment 92, wherein the second tackifier component comprises C5, C9, C5/C9, dicyclopentadiene, terpene, or their hydrogenated resins, or combinations thereof.

Embodiment 100

The foam tape of embodiment 92, wherein the second adhesive composition comprises at least about 2.0 wt. % of the second macromonomer component for a total weight of the second adhesive composition, at least about 3.0 wt. % or at least about 4.0 wt. % or at least about 5.0 wt. % or at least about 6.0 wt. % or at least about 7.0 wt. % or at least about 8.0 wt. % or at least about 9.0 wt. % or at least about 10.0 wt. % or at least about 12.5 wt. % or at least about 15.0 wt. % or at least about 17.5 wt. % or at least about or at least about 20.0 wt. %.

Embodiment 101

The foam tape of embodiment 92, wherein the second adhesive composition comprises not greater than about 40 wt. % of the second macromonomer component for a total weight of the second adhesive composition, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. %.

Embodiment 102

The foam tape of embodiment 92, wherein the second adhesive composition comprises at least about 50 wt. % of the second (meth)acrylic based polymeric component A for a total weight of the second adhesive composition, at least about 52 wt. % or at least about 55 wt. % or at least about 57 wt. % or at least about 60.0 wt. % or at least about 62 wt. % or at least about 65 wt. % or at least about 67 wt. % or at least about 70.0 wt. % or at least about 72 wt. % or at least about 75 wt. % or at least about 77 wt. % or at least about 80 wt. %.

Embodiment 103

The foam tape of embodiment 92, wherein the second adhesive composition comprises not greater than about 90 wt. % of the second (meth)acrylic based polymeric component A for a total weight of the second adhesive composition, not greater than about 88 wt. % or not greater than about 85 wt. % or not greater than about 83 wt. % or not greater than about 80 wt. % or not greater than about 78 wt. %.

Embodiment 104

The foam tape of embodiment 92, wherein the second adhesive composition comprises at least about 0.1 wt. % of the second tackifier component for a total weight of the second adhesive composition, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or at least about 10 wt. %.

Embodiment 105

The foam tape of embodiment 92, wherein the adhesive composition comprises not greater than about 30 wt. % of the second tackifier component for a total weight of the second adhesive composition, not greater than about 28 wt. % or not greater than about 25 wt. % or not greater than about 23 wt. % or not greater than about 20 wt. % or not greater than about 18 wt. % or not greater than about 15 wt. % not greater than about 13 wt. % or not greater than about 11 wt. %.

Embodiment 106

The foam tape of embodiment 95, wherein the second (meth)acrylic based polymeric component A comprises at least about 0.1 wt. % of the second monomer component a1 for a total weight of the second (meth)acrylic based polymeric component A, or at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. %.

Embodiment 107

The foam tape of embodiment 95, wherein the second (meth)acrylic based polymeric component A comprises not greater than about 10.0 wt. % of the second monomer component a1 for a total weight of the second (meth)acrylic based polymeric component A, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3.0 wt. %.

Embodiment 108

The foam tape of embodiment 95, wherein the second (meth)acrylic based polymeric component A comprises at least about 80 wt. % of the second monomer component a2 for a total weight of the second (meth)acrylic based polymeric component A, at least about 82 wt. % or at least about 85 wt. % or at least about 87 wt. % or at least about 90 wt. % or at least about 92 wt. % or at least about 95 wt. % or at least about 97 wt. %.

Embodiment 109

The foam tape of embodiment 95, wherein the second (meth)acrylic based polymeric component A comprises not greater than about 99 wt. %.

EXAMPLES

The concepts described herein will be further described in the following Examples, which do not limit the scope of the invention described in the claims.
Testing Methods
The following test methods have been used to evaluate adhesives of the invention. All percentages, parts and ratios within the specification, including the examples, and the claims are by weight unless specifically stated otherwise.
Test Method A1:
A strip of anodized aluminum (dimensions 19 mm×200 mm×0.125 mm) is positioned on the non-testing adhesive face of a tape sample 10 mm wide and at least 100 mm long. Pressure is applied to the aluminum by rolling with a 6.8 kg roller. The opposite face (testing side) of the sample is then firmly bonded to either a polypropylene or polypropylene-ethylene propylene diene terpolymer panel pre-cleaned with either heptane or isopropyl alcohol.

After being conditioned for 24 hours at room temperature and 50% relative humidity, the sample is removed by pulling the aluminum strip at 90° to the adhesive surface at a speed of 30.5 cm/minute. The test value is reported as the force needed to remove the tape from the plastic panel (adhesive delamination), or cohesively split the tape. Foam split (FS)

is the most desirable failure mode as it indicates adhesion to the substrate is stronger than the internal strength of the foam layer.

Test Method B1:

The non-testing adhesive face of a 2.54 cm×2.54 cm piece of foam tape is positioned onto the center along the long edge of a 7.62 cm×5.08 cm aluminum panel, and rolled by a 6.8 Kg weight. The other side (testing side) of the foam tape is applied onto a 7.62 cm×5.08 cm polypropylene or polypropylene-ethylene propylene diene terpolymer panel pre-cleaned with either heptane or isopropyl alcohol, and rolled again. After being conditioned for 24 hours at room temperature and 50% relative humidity, the assembly is hung at 2 degrees from the vertical for 15 minutes in an air circulating oven which has been pre-heated to 70° C., after which a 500 gram weight is immediately attached through a pre-drilled hole on the aluminum panel. The time at which the weight falls off is recorded in hours. If no failure occurs after 10,000 minutes, the test is discontinued.

Test Method B2:

The test conditions are the same as B1 except that the oven has been pre-heated to 80° C. instead.

Test Method B3:

The test conditions are the same as B1 except that the oven has been pre-heated to 90° C. instead.

Test Method B4:

The test conditions are the same as B1 except that the oven has been pre-heated to 100° C. instead.

Test Method C1:

The test conditions are similar to Test Methods A1, except that after conditioned for 24 hours at room temperature and 50% relative humidity the assembly is left inside an 80° C. air circulating oven for 72 hours. The assembly is then removed from the oven, cooled at room temperature and 50% relative humidity the assembly for 1 hour, and tested.

Test Method C2:

The test conditions are similar to Test Methods A2, except that after conditioned for 24 hours at room temperature and 50% relative humidity the assembly is left inside an 90° C. air circulating oven for 168 hours. The assembly is then removed from the oven, cooled at room temperature and 50% relative humidity the assembly for 1 hour, and tested.

Test Method D:

The weight average molecular weight (Mw) and the polydispersity index (PDI) of the samples are determined via gel permeation chromatography (GPC). A Shimadzu Prominence LC-20AD system with a Shimadzu RID-20A refractive index detector was used. The GPC was equipped with a set of oligomer columns, which were calibrated with 10 narrow polydispersity polystyrene standards to give a linear calibration range from 200 to $2\times10^7$ g mol$^{-1}$. Tetrahydrofuran (THF, flow rate of 1 mL min$^{-1}$) was used as the effluent at 40° C. For each measurement, 30 mg of polymer was dissolved in 4 mL of THF, and filtered through a 200 μm nylon filter prior to injection.

Test Method E:

The glass transition temperatures ($T_g$) of purified macromonomer samples were determined via differential scanning calorimetry (DSC). Approximately 5 mg of each macromonomer was placed into a hermetically sealed aluminum pan. The sample was subjected to a heating rate of 10° C./min from 20 to 200° C. for two cycles. The $T_g$ was determined from the change in heat flow during the second cycle.

Raw Materials:

All chemicals were used as received without further purification or treatment.

| Raw materials | Manufacturer |
|---|---|
| 2-EHA, 2-ethylhexyl acrylate | Acros Organics |
| AA, acrylic acid | Sigma Aldrich |
| IBOA, isobornyl acrylate | Sigma-Aldrich |
| IBOMA, isobornyl methacrylate | Sigma-Aldrich |
| BDK, benzil dimethyl ketal | BASF |
| IOTG, isooctyl thioglycolate | Sigma-Aldrich |
| HDDA, 1,6-hexanediol-diacrylate | Sigma-Aldrich |
| Butyl acetate | Sigma-Aldrich |
| AIBN, azobisisobutyronitrile | Sigma-Aldrich |
| CoBF, Bis(boron difluorodimethylgloximate) cobaltate (II) | Saint-Gobain Research (See Bakac et al. *Inorg. Chem.* 1986, 25, 23, 4108-4114) |
| R1094, Regalrez 1094, Hydrogenated hydrocarbon tackifier, | Eastman Chemical |

The adhesive is coated and cured either on a 50 micron PET film, or on a 0.9 mm proprietary acrylic foam core made from approximately 10% wt of acrylic acid, 90% wt of 2-ethylhexyl acrylate, microspheres and other commonly used materials.

Example 1: Samples S1-S5

Sample adhesive compositions S1-S5 was formed according to embodiments described herein. The composition of sample adhesives S1-S5 is summarized in Table 1 below.

TABLE 1

| | | Sample Adhesive Composition | | | | |
|---|---|---|---|---|---|---|
| Component | pphr in final syrup | | S1 | S2 | S3 | S4 |
| Macro-monomer | 9.1 | | M1 | M2 | M3 | M4 |
| Component A | 72.4 | 2-EHA | 97.5 | 97.5 | 97.5 | 97.5 |
| | | AA | 2.5 | 2.5 | 2.5 | 2.5 |
| Tackifier | 9.1 | | R1094 | R1094 | R1094 | R1094 |
| IBOA | 9.1 | | | | | |
| BDK | 0.16 | | | | | |
| HDDA | 0.14 | | | | | |

The macromonomers used in adhesive compositions S1-S5 were synthesized via cobalt mediated catalytic chain transfer polymerization of isobornyl methacrylate in butyl acetate. IBOMA (50 g), AIBN (0.10 g), and butyl acetate (48 g) were combined in a 250 mL three neck round bottom flask. CoBF (2 mg) and butyl acetate (10 g) were combined in a 20 mL scintillation vial and sonicated for 10 minutes to create a CoBF/butyl acetate stock solution. Depending on the amount of CoBF catalyst required, approximately 2 to 2.5 g of stock solution was then added to the monomer solution in the 250 mL round bottom flask. The solution containing monomer, thermal initiator, and catalyst was then degassed by nitrogen purge for 1 hour. The flask was then placed into a heated oil bath at 80° C. for 4.5 hours. The macromonomer was isolated by precipitation in a cold methanol/THF mixture (20:1 ratio of methanol to THF) under continuous agitation with a stir bar at 600 rpm. The isolated macromonomer was then dried in a vacuum oven set at 85° C. for 24 hours to remove the majority of residual organic volatile contaminants. The properties of sample macromonomers M1-M4 are shown in Table 2.

TABLE 2

Properties of sample macromonomers

| Macromonomer | $M_w$ (g/mol) | PDI | $T_g$ (° C.) |
|---|---|---|---|
| M1 | 14300 | 1.6 | 142 |
| M2 | 11900 | 1.4 | 128 |
| M3 | 21400 | 1.6 | 149 |
| M4 | 9800 | 1.9 | 118 |

Component A in sample adhesive composition S1-S5 were made by copolymerizing a mixture of 2-EHA (389.9 g) and AA (10 g) under UV-initiated radical photopolymerization. BDK (0.1 g) was dissolved in the above monomer mixture, which was then purged with nitrogen gas for 1 hour prior to UV exposure with a 365 nm, 5 mW/cm² UV light. The polymerization was carried out until a temperature increase of 15-20° C. was observed. The resulting polymeric component A had a viscosity of approximately 10000 cP.

The sample adhesive composition S1 was formed by first combining the relevant macromonomer, component A, tackifier, IBOA, BDK, and HDDA in the amounts as indicated Table 1. The different components were mixed at room temperature until the macromonomer component was fully dissolved to make syrup S1. The syrup was then coated onto the aforementioned 0.9 mm acrylic foam core or onto a 50 micron PET film, and cured under 365 nm, 5 mW/cm² UV light for 8 minutes to form an adhesive coating with an approximate thickness of 100 microns For sample adhesive compositions S2, S3, and S4 were made in the same method as sample adhesive composition S1, except that the relevant macromonomer was substituted as specified in Table 1.

Example 2: Samples S5-S7

Sample adhesive composition S5 S7 were formed according to embodiments described herein. The composition of sample adhesives S5-S7 are summarized in Table 3 below.

TABLE 3

Sample Adhesive Composition

| Component | pphr in final syrup | | S5 | S6 | S7 |
|---|---|---|---|---|---|
| Macromonomer | 10 | | M5 | M6 | M7 |
| Component A | 72.7 | 2-EHA | 95 | 95 | 97.5 |
| | | AA | 5 | 5 | 2.5 |
| Tackifier | 10 | | R1094 | R1094 | R1094 |
| IBOA | 10 | | | | |
| BDK | 0.17 | | | | |
| HDDA | | | | 0.13 | |

The macromonomers used in adhesive compositions S6-S8 were synthesized via cobalt mediated catalytic chain transfer polymerization of isobornyl methacrylate and isobornyl acrylate in butyl acetate in an analogous procedure to macromonomers M1-M5. The amount of IBOA co-monomer was varied in macromonomers M5-M7 as different weight percentages of the final macromonomer composition. The properties of sample macromonomers M6-M8 are shown in Table 4.

TABLE 4

Properties of sample macromonomers

| Macromonomer | IBOA (wt %) | $M_w$ (g/mol) | PDI | $T_g$ (° C.) |
|---|---|---|---|---|
| M5 | 10 | 15900 | 1.5 | 111 |
| M6 | 25 | 27600 | 1.7 | 111 |
| M7 | 30 | 45100 | 2.1 | 116 |

Component A in sample adhesive composition S5-S6 were made by copolymerizing a mixture of 2-EHA (379.9 g) and AA (20 g) under UV-initiated radical photopolymerization. BDK (0.1 g) was dissolved in the above monomer mixture, which was then purged with nitrogen gas for 1 hour prior to UV exposure with a 365 nm, 5 mW/cm² UV light. The polymerization was carried out until a temperature increase of 15-20° C. was observed. The resulting polymeric component A had a viscosity of approximately 10000 cP. Component A in sample adhesive composition S7 was prepared as in sample adhesive S1.

The sample adhesive compositions S5-S7 were made in the same method as sample adhesive composition S1, except that the relevant macromonomer was substituted as specified in Table 3.

Example 3: Comparative Samples C1-C3

Comparative sample adhesive compositions C1-C3 were prepared to illustrate the unique properties of the described graft copolymer based adhesive. The composition of the comparative sample adhesives C1-C3 are summarized in Table 5 below.

TABLE 5

Sample Adhesive Composition

| Component | pphr in final syrup | | C1 | C2 | C3 |
|---|---|---|---|---|---|
| Component B | 9.1 | | IBOMA | P1 | P2 |
| Component A | 72.4 | 2-EHA | 97.5 | 97.5 | 97.5 |
| | | AA | 97.5 | 97.5 | 2.5 |
| Tackifier | 9.1 | | R1094 | R1094 | R1094 |
| IBOA | 9.1 | | | | |
| BDK | 0.16 | | | | |
| HDDA | 0.14 | | | | |

Component B in the comparative adhesive compositions varied as follows. In comparative adhesive C1, the macromonomer component was replaced by IBOMA monomer. In comparative adhesives C2 and C3, the macromonomer component was replaced by a standard non-reactive poly (isobornyl methacrylate) polymer prepared via bulk photoinitiated polymerization with IOTG as chain transfer agent in a heated water bath set at 80° C. The polymer properties are summarized in Table 6 below.

TABLE 6

Properties of sample poly(isobornyl methacrylate)

| Poly(IBOMA) | $M_w$ (g/mol) | PDI |
|---|---|---|
| P1 | 15900 | 1.9 |
| P2 | 37300 | 3.3 |

Component A in comparative adhesive compositions C1-C3 were was prepared as per the instructions given for in sample adhesive S1. The comparative adhesive compositions C1-C3 were made by combining component B, component A, tackifier, IBOA, BDK, and HDDA in the amounts as indicated Table 5. The different components were mixed at room temperature until component B was fully dissolved to make syrup C1-C3. The syrup was then coated onto the aforementioned 0.9 mm acrylic foam core or onto a 50 micron PET film, and cured under 365 nm, 5 mW/cm$^2$ UV light for 8 minutes to form an adhesive coating with an approximate thickness of 100 microns.

The advantageous adhesion of our sample adhesives to low surface energy substrates such as polypropylene and polypropylene/polyethylene copolymers was evaluated using Test Method A1. The peel strength of sample adhesives S1-S7 and comparative adhesives C1-C3 are summarized in Table 7 below. The abbreviation AD stands for adhesive failure, and the abbreviation FS stands for foam split.

TABLE 7

Peel strength of sample adhesive compositions S1-S7 and comparative adhesive composition C1-C3.

|    | Test A1 (N/cm) |
|----|----------------|
| S1 | 43.1, FS       |
| S2 | 41.6, FS       |
| S3 | 42.2, FS       |
| S4 | 40.0, FS       |
| S5 | 40.7, FS       |
| S6 | 44.4, FS       |
| S7 | 38.8, FS/AD    |
| C1 | 35.2, AD       |
| C2 | 35.2, AD       |
| C3 | 32.6, AD       |

The data clearly shows that the adhesives of the present invention containing a macromonomer component and graft copolymer structure has superior peel adhesion to low surface energy substrates, such as polypropylene/polyethylene.

The high internal cohesive strength of the present invention was also evaluated using high temperature static shear tests. The performance of adhesive samples S1-S6 and comparative adhesives C1-C3 in different static shear tests are summarized in Table 8.

TABLE 8

Performance of sample adhesive compositions S1-S7 and comparative adhesive composition C1-C3 in high temperature static shear tests.

|    | Test B1 - 70° C. | Test B2 - 80° C. | Test B3 - 90° C. | Test B4 - 100° C. |
|----|------------------|------------------|------------------|-------------------|
| S1 | >168 hr          | >168 hr          |                  |                   |
| S2 | >168 hr          | 24.0 hr          |                  |                   |
| S3 | >168 hr          | >168 hr          |                  |                   |
| S5 |                  | >168 hr          | >168 hr          | >168 hr           |
| S6 |                  | >168 hr          | >168 hr          | >168 hr           |
| S7 |                  | >168 hr          |                  |                   |
| C1 | 6.5 hr           |                  |                  |                   |
| C2 | 4.0 hr           |                  |                  |                   |
| C3 | 6.0 hr           |                  |                  |                   |

The data clearly shows that the adhesives of the present invention containing a macromonomer component and graft copolymer structure has superior internal cohesive strength, and excellent static shear resistance up to 100° C. The comparative adhesives fail to pass any of the high temperature static shear tests with rapid creep and failure in less than 6 hours.

The inventive adhesives also possess a graft copolymer structure which provides superior resistance to aging and migration of the tackifier component. This was evaluated with a peel test after accelerated aging in a high temperature environment, which increases the mobility of the tackifier component. The peel strength of sample adhesives S1-S6 and comparative adhesive C1-C3 after accelerated aging at high temperature is summarized in Table 9 below.

TABLE 9

Peel strength of sample adhesive compositions S1-S6 and comparative adhesive composition C1-C3 after accelerated aging at high temperature.

|    | Test C1 (N/cm) 80° C., 72 hrs | Test C2 (N/cm) 90° C., 168 hrs |
|----|-------------------------------|--------------------------------|
| S1 | 42.8, FS                      |                                |
| S2 | 43.6, FS                      |                                |
| S3 | 43.9, FS                      |                                |
| S4 | 44.6, FS                      |                                |
| S5 | 43.3, FS                      | 37.3, FS                       |
| S6 | 39.5, FS                      | 36.7, FS                       |
| C1 | 10.5, AD                      |                                |
| C2 | 13.7, AD                      |                                |
| C3 | 16.5, AD                      |                                |

The data clearly shows that the adhesives of the present invention containing a macromonomer component and graft copolymer structure has superior peel adhesion to low surface energy substrates even after harsh accelerated aging conditions at high temperature.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An adhesive comprising an adhesive structure and an adhesive composition, wherein the adhesive structure comprises a graft copolymer and wherein the adhesive composition comprises:
- at least 1 wt. % and not greater than 40 wt. % of a macromonomer component for a total weight of the adhesive composition;
- at least 50 wt. % and not greater than 90 wt. % of a (meth)acrylic based polymeric component A for a total weight of the adhesive composition; and
- at least 0.1 wt. % and not greater than 30 wt. % of a tackifier component for a total weight of the adhesive composition,
    - wherein the macromonomer component has a weight-average molecular weight of at least 1000 g/mol,
    - wherein the macromonomer component has a glass transition temperature of at least 40° C., and
    - wherein the (meth)acrylic based polymeric component A has a glass transition temperature (Tg) of not greater than 20° C.

2. The adhesive of claim 1, wherein the graft copolymer of the adhesive structure comprises a backbone portion and a grafted side chain portion, wherein the backbone portion comprises the (meth)acrylic based polymeric component A, and wherein the grafted side chain portion comprises the macromonomer component.

3. The adhesive of claim 1, wherein the graft copolymer of the adhesive structure is formed via radiation initiated polymerization.

4. The adhesive of claim 1, wherein the (meth)acrylic based polymeric component A comprises a reaction product of polymerizable material comprising:
- at least 0.1 wt. % and not greater than 10 wt. % of a monomer component a1 for a total weight of the (meth)acrylic based polymeric component A, wherein the monomer component a1 comprises an ethylenically unsaturated functional monomer with a pendant hydrogen bonding group; and
- at least 80 wt. % and not greater than 99 wt. % of a monomer component a2 for a total weight of the (meth)acrylic based polymeric component A, wherein the monomer component a2 comprises an ethylenically unsaturated monomer.

5. The adhesive of claim 4, wherein the monomer component a1 comprises ethylenically unsaturated functional monomer selected from the group consisting of acid containing (meth)acrylic monomers, hydroxyl containing (meth)acrylic monomers (2-hydroxyethyl (meth) acrylate), a nitrogen containing monomer having a primary, secondary, or tertiary amino group, and a nitrogen containing monomer having a primary, secondary, or tertiary amido group.

6. The adhesive of claim 4, wherein the monomer component a2 comprises an acrylic ester of the formula $C{=}C(R^2)(COOR^1)$ where R1 is a alkyl group containing 1 to 24 carbons, and R2 is H or methyl.

7. The adhesive of claim 1, wherein the macromonomer component comprises a (meth)acrylic monomer having a pendant alicyclic functional group, wherein said macromonomer component is capable of being polymerized in a free radical polymerization process.

8. The adhesive of claim 1, wherein the tackifier component comprises C5, C9, C5/C9, dicyclopentadiene, terpene, or their hydrogenated resins, or combinations thereof.

9. The adhesive of claim 2, wherein the graft copolymer of the adhesive structure is formed via radiation initiated polymerization.

10. The adhesive of claim 2, wherein the (meth)acrylic based polymeric component A comprises a reaction product of polymerizable material comprising:
- at least 0.1 wt. % and not greater than 10 wt. % of a monomer component a1 for a total weight of the (meth)acrylic based polymeric component A, wherein the monomer component a1 comprises an ethylenically unsaturated functional monomer with a pendant hydrogen bonding group; and
- at least 80 wt. % and not greater than 99 wt. % of a monomer component a2 for a total weight of the (meth)acrylic based polymeric component A, wherein the monomer component a2 comprises an ethylenically unsaturated monomer.

11. The adhesive of claim 2, wherein the monomer component a1 comprises ethylenically unsaturated functional monomer selected from the group consisting of acid containing (meth)acrylic monomers, hydroxyl containing (meth)acrylic monomers, a nitrogen containing monomer having a primary, secondary, or tertiary amino group, and a nitrogen containing monomer having a primary, secondary, or tertiary amido group.

12. The adhesive of claim 11, wherein the monomer component a2 comprises an acrylic ester of the formula $C{=}C(R^2)(COOR^1)$ where R1 is a alkyl group containing 1 to 24 carbons, and R2 is H or methyl.

13. The adhesive of claim 2, wherein the macromonomer component comprises a (meth)acrylic monomer having a pendant alicyclic functional group, wherein said macromonomer component is capable of being polymerized in a free radical polymerization process.

14. The adhesive of claim 2, wherein the tackifier component comprises C5, C9, C5/C9, dicyclopentadiene, terpene, or their hydrogenated resins, or combinations thereof.

* * * * *